(12) United States Patent
Leonelli et al.

(10) Patent No.: US 10,409,562 B2
(45) Date of Patent: Sep. 10, 2019

(54) METHOD AND APPARATUS FOR AUTOMATICALLY GENERATING AND INCORPORATING CODE IN DEVELOPMENT ENVIRONMENTS

(71) Applicant: Ciambella Ltd., Tortola (VG)

(72) Inventors: Jean-Baptiste Leonelli, Levallois (FR); Trisala Chandaria, New York, NY (US)

(73) Assignee: Ciambella Ltd., Tortola (VG)

( * ) Notice: Subject to any disclaimer, the term of this patent is extended or adjusted under 35 U.S.C. 154(b) by 0 days.

(21) Appl. No.: 15/920,929

(22) Filed: Mar. 14, 2018

(65) Prior Publication Data

US 2018/0267779 A1    Sep. 20, 2018

Related U.S. Application Data

(60) Provisional application No. 62/471,071, filed on Mar. 14, 2017.

(51) Int. Cl.
*G06F 9/44* (2018.01)
*G06F 8/34* (2018.01)
(Continued)

(52) U.S. Cl.
CPC ............. *G06F 8/34* (2013.01); *G06F 8/30* (2013.01); *G06F 8/36* (2013.01); *G06F 8/41* (2013.01);
(Continued)

(58) Field of Classification Search
CPC ..... G06F 8/34; G06F 8/35; G06F 8/36; G06F 8/37
(Continued)

(56) References Cited

U.S. PATENT DOCUMENTS 5,012,402 A    4/1991 Akiyama
5,623,604 A    4/1997 Russell et al.
(Continued)

FOREIGN PATENT DOCUMENTS

CN    1821964 A    8/2006
CN    201017215 Y    2/2008
(Continued)

OTHER PUBLICATIONS

Karpuzcu, "Automatic Verilog Code Generation through Grammatical Evolution", ACM, pp. 394-397, 2005 (Year: 2005).*
(Continued)

*Primary Examiner* — Anil Khatri
(74) *Attorney, Agent, or Firm* — Moser Taboada

(57) ABSTRACT

A method and apparatus for automatically generating and incorporating code in a development environment (DE) is provided. The method comprises, while a program for a target device is being composed using the DE on a user device, displaying an automatic code generation user interface (ACGUI), separate from the DE or in the context of the DE, receiving a selection of a function from a plurality of available functions for generating code automatically corresponding to the selected function, receiving at least one parameter for executing the automatically generated code to perform the function, automatically generating the code in the ACGUI, the automatically generated code configured to perform the function upon execution of the automatically generated code, incorporating the automatically generated code in the program for the target device, and sending the program to the target device for installation and execution on the target device.

20 Claims, 14 Drawing Sheets

(51) Int. Cl.
*G06F 8/61* (2018.01)
*G06F 11/36* (2006.01)
*G06F 9/455* (2018.01)
*G06F 8/30* (2018.01)
*G06F 8/36* (2018.01)
*G06F 8/41* (2018.01)

(52) U.S. Cl.
CPC ............... *G06F 8/447* (2013.01); *G06F 8/61* (2013.01); *G06F 9/45504* (2013.01); *G06F 11/3664* (2013.01); *G06F 11/3688* (2013.01)

(58) Field of Classification Search
USPC .................................. 717/109–116, 120–122
See application file for complete search history.

(56) References Cited

U.S. PATENT DOCUMENTS

| | | | |
|---|---|---|---|
| 5,852,733 A | 12/1998 | Chien et al. | |
| 5,887,172 A | 3/1999 | Vasudevan et al. | |
| 6,065,053 A | 5/2000 | Nouri et al. | |
| 6,108,715 A | 8/2000 | Leach et al. | |
| 6,158,031 A | 12/2000 | Mack et al. | |
| 6,266,809 B1 | 7/2001 | Craig et al. | |
| 6,324,681 B1 | 11/2001 | Sebesta et al. | |
| 6,366,300 B1 | 4/2002 | Ohara et al. | |
| 6,388,683 B1 | 5/2002 | Ishai et al. | |
| 6,401,156 B1 | 6/2002 | Mergard et al. | |
| 6,490,723 B1 | 12/2002 | Bearden et al. | |
| 6,715,132 B1 | 3/2004 | Bartz et al. | |
| 6,889,002 B1 | 5/2005 | Hayashi et al. | |
| 6,894,991 B2 | 5/2005 | Ayyagari et al. | |
| 6,895,573 B2 | 5/2005 | Norgaard et al. | |
| 6,931,288 B1 | 8/2005 | Lee et al. | |
| 6,966,039 B1 | 11/2005 | Bartz et al. | |
| 7,010,773 B1 | 3/2006 | Bartz et al. | |
| 7,043,715 B1 | 5/2006 | Bauer et al. | |
| 7,069,536 B2 | 6/2006 | Yaung | |
| 7,086,014 B1 | 8/2006 | Bartz et al. | |
| 7,114,154 B1 | 9/2006 | Crohn | |
| 7,127,705 B2 | 10/2006 | Christfort et al. | |
| 7,136,709 B2 | 11/2006 | Arling et al. | |
| 7,143,360 B1 | 11/2006 | Ogami et al. | |
| 7,152,229 B2 | 12/2006 | Chong et al. | |
| 7,246,319 B2 | 7/2007 | Alden et al. | |
| 7,281,236 B1 | 10/2007 | Galvin et al. | |
| 7,293,255 B2* | 11/2007 | Kumar | G06F 9/453 717/109 |
| 7,475,107 B2 | 1/2009 | Maconi et al. | |
| 7,752,556 B2 | 7/2010 | Forstall et al. | |
| 7,784,030 B2 | 8/2010 | Christfort et al. | |
| 7,890,925 B1* | 2/2011 | Wyatt | G06F 9/4411 717/106 |
| 7,934,197 B2* | 4/2011 | Thorell | G06F 21/51 713/176 |
| 7,954,150 B2 | 5/2011 | Croft et al. | |
| 8,028,258 B1 | 9/2011 | Ogami et al. | |
| 8,055,386 B2 | 11/2011 | McCoy et al. | |
| 8,086,744 B2 | 12/2011 | Abdullah et al. | |
| 8,245,186 B2 | 8/2012 | Gryko et al. | |
| 8,332,809 B2 | 12/2012 | Mauceri et al. | |
| 8,352,903 B1 | 1/2013 | Friedman | |
| 8,386,610 B2* | 2/2013 | Yahalom | G06F 3/0605 709/226 |
| 8,387,005 B1* | 2/2013 | Ghosh-Roy | G06F 8/34 717/109 |
| 8,458,653 B2* | 6/2013 | Hudson, III | G06F 11/3664 715/763 |
| 8,508,367 B2 | 8/2013 | Shafer | |
| 8,544,007 B2* | 9/2013 | Al-Aziz | H04L 67/02 717/168 |
| 8,572,560 B2 | 10/2013 | Drissi et al. | |
| 8,578,347 B1* | 11/2013 | Carrick | G06F 11/3409 717/104 |
| 8,639,644 B1 | 1/2014 | Hickman et al. | |
| 8,694,954 B2 | 4/2014 | Ortiz | |
| 8,752,033 B2 | 6/2014 | Mohammed et al. | |
| 8,904,299 B1* | 12/2014 | Owen | G06F 8/315 715/763 |
| 8,959,477 B2 | 2/2015 | Mueller | |
| 8,990,787 B2 | 3/2015 | Balassanian | |
| 9,063,753 B2 | 6/2015 | Schaude | |
| 9,148,413 B1 | 9/2015 | Marr et al. | |
| 9,229,842 B2* | 1/2016 | Broda | G06F 11/3495 |
| 9,239,705 B2* | 1/2016 | Chandaria | G06F 9/44536 |
| 9,262,140 B2* | 2/2016 | Rangan | G06F 8/4451 |
| 9,372,785 B2 | 6/2016 | Wang et al. | |
| 9,495,473 B2* | 11/2016 | Gardner | H04L 67/36 |
| 9,626,207 B2* | 4/2017 | Graham | G06F 9/45558 |
| 9,678,747 B2 | 6/2017 | Beckett | |
| 9,696,971 B1* | 7/2017 | Wierda | G06F 8/41 |
| 9,898,393 B2* | 2/2018 | Moorthi | G06F 11/368 |
| 9,921,827 B1* | 3/2018 | Evans | G06F 8/71 |
| 2002/0078168 A1 | 6/2002 | Christfort et al. | |
| 2002/0169850 A1 | 11/2002 | Batke et al. | |
| 2002/0184610 A1 | 12/2002 | Chong et al. | |
| 2002/0188597 A1 | 12/2002 | Kern et al. | |
| 2002/0194313 A1 | 12/2002 | Brannock | |
| 2003/0023839 A1 | 1/2003 | Burkhardt et al. | |
| 2003/0037181 A1 | 2/2003 | Freed | |
| 2003/0051021 A1 | 3/2003 | Hirschfeld et al. | |
| 2003/0061274 A1 | 3/2003 | Lo | |
| 2003/0120707 A1 | 6/2003 | Bogdan et al. | |
| 2003/0177208 A1 | 9/2003 | Harvey | |
| 2003/0204560 A1 | 10/2003 | Chen et al. | |
| 2004/0010734 A1 | 1/2004 | Ghercioiu et al. | |
| 2004/0034842 A1 | 2/2004 | Mantey et al. | |
| 2004/0040028 A1 | 2/2004 | Moreau | |
| 2004/0080770 A1 | 4/2004 | Hirose et al. | |
| 2004/0193635 A1 | 9/2004 | Hsu et al. | |
| 2004/0221238 A1 | 11/2004 | Cifra et al. | |
| 2004/0249944 A1 | 12/2004 | Hosking et al. | |
| 2004/0267926 A1 | 12/2004 | Rothman et al. | |
| 2005/0057436 A1 | 3/2005 | Alden et al. | |
| 2005/0114644 A1 | 5/2005 | Chu et al. | |
| 2005/0114854 A1 | 5/2005 | Padisetty et al. | |
| 2005/0177269 A1 | 8/2005 | Funk | |
| 2005/0198624 A1 | 9/2005 | Chipman | |
| 2005/0256964 A1 | 11/2005 | Dube | |
| 2005/0283786 A1 | 12/2005 | Dettinger et al. | |
| 2006/0020910 A1 | 1/2006 | Schlanger et al. | |
| 2006/0036799 A1 | 2/2006 | Shah et al. | |
| 2006/0041644 A1 | 2/2006 | Henseler | |
| 2006/0041854 A1 | 2/2006 | Schlanger et al. | |
| 2006/0059447 A1 | 3/2006 | Ariyama et al. | |
| 2006/0074733 A1 | 4/2006 | Shukla et al. | |
| 2006/0122730 A1 | 6/2006 | Niemela et al. | |
| 2006/0229924 A1 | 10/2006 | Aron et al. | |
| 2006/0259588 A1 | 11/2006 | Lerman et al. | |
| 2006/0271537 A1 | 11/2006 | Chandrasekharan et al. | |
| 2006/0277158 A1 | 12/2006 | Kim | |
| 2006/0277328 A1 | 12/2006 | Cherian et al. | |
| 2007/0017995 A1 | 1/2007 | Good | |
| 2007/0044086 A1 | 2/2007 | Sampath | |
| 2007/0079282 A1 | 4/2007 | Nachnani et al. | |
| 2007/0096757 A1 | 5/2007 | Puente et al. | |
| 2007/0142929 A1 | 6/2007 | Pereira | |
| 2007/0150749 A1 | 6/2007 | Monaghan et al. | |
| 2007/0174037 A1 | 7/2007 | Ling | |
| 2007/0179955 A1 | 8/2007 | Croft et al. | |
| 2007/0186246 A1 | 8/2007 | Goldhor | |
| 2007/0234341 A1 | 10/2007 | Chang et al. | |
| 2007/0250800 A1 | 10/2007 | Keswick | |
| 2007/0283072 A1 | 12/2007 | Johnson | |
| 2008/0021994 A1 | 1/2008 | Grelewicz et al. | |
| 2008/0040093 A1 | 2/2008 | Sargaison et al. | |
| 2008/0082603 A1 | 4/2008 | Mansour et al. | |
| 2008/0092073 A1 | 4/2008 | Shih et al. | |
| 2008/0109782 A1 | 5/2008 | Adelman et al. | |
| 2008/0137572 A1 | 6/2008 | Park et al. | |
| 2008/0163269 A1 | 7/2008 | Goto | |
| 2008/0189697 A1 | 8/2008 | Kachroo et al. | |
| 2008/0222715 A1 | 9/2008 | Bansal et al. | |

(56) References Cited

U.S. PATENT DOCUMENTS

| | | |
|---|---|---|
| 2008/0288621 A1 | 11/2008 | Snell et al. |
| 2009/0070121 A1 | 3/2009 | Leonelli et al. |
| 2009/0095807 A1 | 4/2009 | Dickerson et al. |
| 2009/0171484 A1 | 7/2009 | Birze et al. |
| 2009/0198770 A1 | 8/2009 | Jiang |
| 2009/0254880 A1 | 10/2009 | Gryko et al. |
| 2010/0010908 A1 | 1/2010 | Pasupulati et al. |
| 2010/0205273 A1 | 8/2010 | Shim |
| 2010/0271989 A1 | 10/2010 | Chernoguzov et al. |
| 2010/0287571 A1 | 11/2010 | Mohammed et al. |
| 2010/0299187 A1 | 11/2010 | Duggal |
| 2010/0333088 A1 | 12/2010 | Rogel et al. |
| 2011/0023031 A1 | 1/2011 | Bonola et al. |
| 2011/0046792 A1 | 2/2011 | Imes et al. |
| 2011/0154305 A1 | 6/2011 | Leroux et al. |
| 2011/0179347 A1 | 7/2011 | Proctor et al. |
| 2011/0238969 A1 | 9/2011 | Warkentin et al. |
| 2011/0246891 A1 | 10/2011 | Schubert et al. |
| 2011/0271269 A1 | 11/2011 | Tazzari et al. |
| 2011/0295391 A1 | 12/2011 | Schneider et al. |
| 2011/0314457 A1 | 12/2011 | Schaude |
| 2012/0022674 A1 | 1/2012 | Choo |
| 2012/0036493 A1 | 2/2012 | Moosmann et al. |
| 2012/0233588 A1 | 9/2012 | Mruthyunjaya et al. |
| 2012/0233589 A1 | 9/2012 | Mruthyunjaya et al. |
| 2012/0233612 A1 | 9/2012 | Beckett |
| 2012/0311526 A1 | 12/2012 | DeAnna et al. |
| 2013/0104100 A1 | 4/2013 | Mueller |
| 2013/0125089 A1 | 5/2013 | Mohammed et al. |
| 2013/0125107 A1 | 5/2013 | Bandakka et al. |
| 2013/0201316 A1 | 8/2013 | Binder et al. |
| 2013/0271659 A1 | 10/2013 | Na et al. |
| 2013/0275560 A1 | 10/2013 | Bestmann et al. |
| 2013/0290856 A1 | 10/2013 | Beveridge et al. |
| 2014/0013299 A1 | 1/2014 | Bordeaux et al. |
| 2014/0040182 A1 | 2/2014 | Gilder et al. |
| 2014/0052945 A1 | 2/2014 | Ashok et al. |
| 2014/0109057 A1 | 4/2014 | Gibbens et al. |
| 2014/0123124 A1 | 5/2014 | Gray et al. |
| 2014/0215433 A1 | 7/2014 | Bergamaschi et al. |
| 2014/0258986 A1 | 9/2014 | Wang et al. |
| 2014/0289699 A1 | 9/2014 | Paterson et al. |
| 2014/0372963 A1 | 12/2014 | Chandaria et al. |
| 2014/0372975 A1 | 12/2014 | Chandaria et al. |
| 2015/0045960 A1 | 2/2015 | Caron et al. |
| 2015/0046902 A1 | 2/2015 | Kumar et al. |
| 2015/0127192 A1 | 5/2015 | Phatak et al. |
| 2015/0199088 A1 | 7/2015 | Chandaria et al. |
| 2015/0286362 A1 | 10/2015 | Chandaria et al. |
| 2015/0331406 A1 | 11/2015 | Wang |
| 2016/0012026 A1 | 1/2016 | Baikov et al. |
| 2016/0043991 A1 | 2/2016 | Eizadi et al. |
| 2016/0315872 A1 | 10/2016 | Eizadi et al. |
| 2016/0327925 A1 | 11/2016 | Leonelli et al. |
| 2016/0357526 A1 | 12/2016 | Soffer et al. |

FOREIGN PATENT DOCUMENTS

| | | |
|---|---|---|
| CN | 101373441 A | 2/2009 |
| CN | 101438299 A | 5/2009 |
| CN | 102177501 A | 9/2011 |
| CN | 102262557 A | 11/2011 |
| CN | 102271153 A | 12/2011 |
| CN | 102479079 A | 5/2012 |
| CN | 102999322 A | 3/2013 |
| EP | 2498178 A1 | 9/2012 |
| EP | 3092561 A1 | 11/2016 |
| JP | 08083173 | 3/1996 |
| JP | 2001005672 A | 1/2001 |
| JP | 2001350885 A | 12/2001 |
| JP | 2004151893 A | 5/2004 |
| JP | 2006107481 A | 4/2006 |
| JP | 2006216048 A | 8/2006 |
| JP | 2006350529 A | 12/2006 |
| JP | 2008021095 A | 1/2008 |
| JP | 2010539600 A | 12/2010 |
| JP | 2011150430 A | 8/2011 |
| JP | 2016112651 A | 6/2016 |
| KR | 20080044576 A | 5/2008 |
| WO | WO-2005050503 A1 | 6/2005 |
| WO | WO-2006080078 A1 | 8/2006 |
| WO | WO-2013058768 A1 | 4/2013 |
| WO | WO-2014204989 A1 | 12/2014 |

OTHER PUBLICATIONS

Strumer et al, "Overview of Existing Safeguarding Techniques for Automatically Generated Code", ACM, pp. 1-6, 2005 (Year: 2005).*
Jelineck et al, "GUI Generation from Annotated Source Code", ACM, pp. 129-136 (Year: 2004).*
Hamri et al, "Automatic Generation of Object-Oriented Code From DEVS Graphical Specifications", IEEE, pp. 1-11 (Year: 2012).*
Murakami, et al, "A Proposal of an Installation Manual Generation Method for Open Source Software Using Operation Logs", IEEE, pp. 547-554 (Year: 2008).*
Bozzon et al, "Conceptual Modeling and Code Generation for RichInternet Applications", ACM, pp. 353-360 (Year: 2006).*
Marshall, "Remote Procedure Calls (RPC)", <https://www.cs.cf.ac.uk/Dave/C/node33.html>, pp. 1-14, Jan. 5, 1999.
Benso et al., "A Software Development Kit for Dependable Applications in Embedded Systems", Conference: Proceedings IEEE International Test Conference, 2000.
Alonso et al., "Computer Networks Exercise 4", ETH, pp. 1-6, 2006.
Rutkowska "Security Challenges in Virtualized Environments" Proc. RSA Conference, pp. 1-97, 2008.
Zhang et al., "CCOA: Cloud Computing Open Architecture", IEEE International Conference on Web Services, ICWS, pp. 607-616, 2009.
International Search Report and Written Opinion dated Mar. 31, 2009 for PCT Application No. PCT/US2008/075880.
International Search Report and Written Opinion dated Mar. 31, 2009 for PCT Application No. PCT/US2008/075878.
Battaglia et al., "An Open and Portable Software Development Kit for Handheld Devices with Proprietary Operating Systems", IEEE Transactions on Consumer Electronics, vol. 55, Issue 4, pp. 2436-2444, Nov. 2009.
Kosta, et al. "Thinkair: Dynamic Resource Allocation and Parallel Execution in the Cloud for Mobile Code Offloading." Infocom, Proceedings IEEE, pp. 945-953, 2012.
Krzyzanowski, "Remote Procedure Calls", pp. 27, Oct. 30, 2012.
Bergen et al., "RPC Automation: Making Legacy Code Relevant", 8th International Symposium on Software Engineering for Adaptive and Self-Managing Systems (SEAMS), pp. 175-180, 2013.
Kasai, "Embedded Middleware and Software Development Kit for Area-Based Distributed Mobile Cache System", IEEE Transactions on Consumer Electronics, vol. 59, Issue 1, pp. 281-289, Feb. 2013.
Liu, "Android Native development Kit Cookbook", Mar. 1, 2013, XP055326992, ISBN: 9781-84969-150-5, retrieved on Dec. 7, 2016 from: http://file.alitebooks.com/20150520/Android%20Native%20Development%20Kit%20Cookbook.pdf, pp. 1-331.
Zhongcheng et al., Web-based Remote Networked Control for Smart homes, Wuhan University, pp. 6567-6571, Jul. 26-28, 2013.
International Search Report and Written Opinion dated Oct. 30, 2014 for PCT Application No. PCT/US2014/046215.
International Search Report and Written Opinion dated Oct. 31, 2014 for PCT Application No. PCT/US2014/042783.
International Search Report and Written Opinion dated Oct. 31, 2014 for PCT Application No. PCT/US2014/042774.
International Search Report and Written Opinion dated Nov. 3, 2014 for PCT Application No. PCT/US2014/042780.
International Search Report and Written Opinion dated Apr. 22, 2015 for PCT Application No. PCT/US2015/010562.
International Search Report and Written Opinion dated Aug. 11, 2016 for PCT Application No. PCT/US2016/031217.
International Search Report and Written Opinion dated Oct. 4, 2016 for PCT Application No. PCT/US2016/041573.

(56) References Cited

OTHER PUBLICATIONS

International Search Report and written Opinion dated Apr. 13, 2017 for PCT Application No. PCT/US2016/067944.
Extended European Search Report dated Oct. 23, 2017 for Application No. 15735508.2.
International Search Report and Written Opinion dated Nov. 15, 2017 for PCT Application No. PCT/US2017/047944.
International Search Report and Written Opinion dated Nov. 24, 2017 for PCT Application No. PCT/US2017/047964.
International Search Report and Written Opinion dated Jun. 15, 2018 for PCT Application No. PCT/US2018/022359.
Haruyoshi Maruyama, "How to Use Device Driver Configurator," Interface, CQ Publishing Co., Ltd., vol. 33, No. 6, Jun. 1, 2007, pp. 57-70.
International Search Report and Written Opinion dated Apr. 22, 2019 for PCT Application No. PCT/US18/63704.
Kreger, Heather, "Web Services Conceptual Architecture (WSCA 1.0)," Internet Citation, May 2001.

* cited by examiner

```
EXPLORER                    Untitled-1  Untitled-2 ×
▲ OPEN EDITORS              1  #include <Bridge.h>
   Untitled-1                  #include <Temboo.h>
  × Untitled-2                 #include "TembooAccount.h"  // contains Temboo account information, as
▲ NO FOLDER OPENED                                          described below
  You have not yet opened a
  folder.                      int calls=1;   // Execution count, so this doesn't run forever
         Open Folder           int maxCalls=10;  // Maximum number of time the Choreo should be executed ▲ TEMBOO                       void setup() {
  CHOREOS                         Serial.begin(9600);
  ▶ 23andMe
  ▶ Amazon                       // For debugging, wait until the serial console is connected
  ▶ AuthorizeNet                 delay(4000);
  ▶ Basecamp                     while(!Serial);
  ▶ Bitly                        Bridge.begin();                              902
  ▶ Box                        }
  ▶ Clicky
  ▶ CloudMine
  ▶ ConstantContact
  ▶ CorpWatch
  ▶ DailyMed
  ▶ DataGov
  ▶ Delicious
  ▶ Disqus
  ▶ DonorsChoose
  ▶ Dropbox
  ▶ DuckDuckGo
  ▶ Dwolla
                                                    900
```

FIG. 9

INPUT          1300      Twitter...entials ▼ (Save)

[Abc] AccessToken
The Access Token provided by Twitter or retrieved during the OAuth process.

```
26771931-Yty7APqMfZgOMtellUXvYUqDr3P7Elgg1vQAMdQ8
```

[Abc] AccessTokenSecret
The Access Token Secret provided by Twitter or retrieved during the OAuth process.

```
O5nNlfmfzwRwSICwQOouoCRvWIIUCrzYMTW3gTOMl
```

[Abc] ConsumerKey
The API Key (or Consumer Key) provided by Twitter.

```
x1HURLmTxeZaVWvZLQDOQ
```

[Abc] ConsumerSecret
The API Secret (or Consumer Secret) provided by Twitter.

```
36QboFpr8EK|1l1wT26R5HkXo9BSQSSxZ96gsnjBmc4
```

[Abc] ScreenName
The Screen name of the user who should receive the direct message. Required unless specifying the UserId.

```
@testuser
```

[Abc] Text
The Text for the direct message. Max characters is 140.

```
Hello!!!!
```

[Abc] UserID
The ID of the user who should receive the direct message. Required unless specifying the ScreenName.

```
```

(Generate Code)

FIG. 13

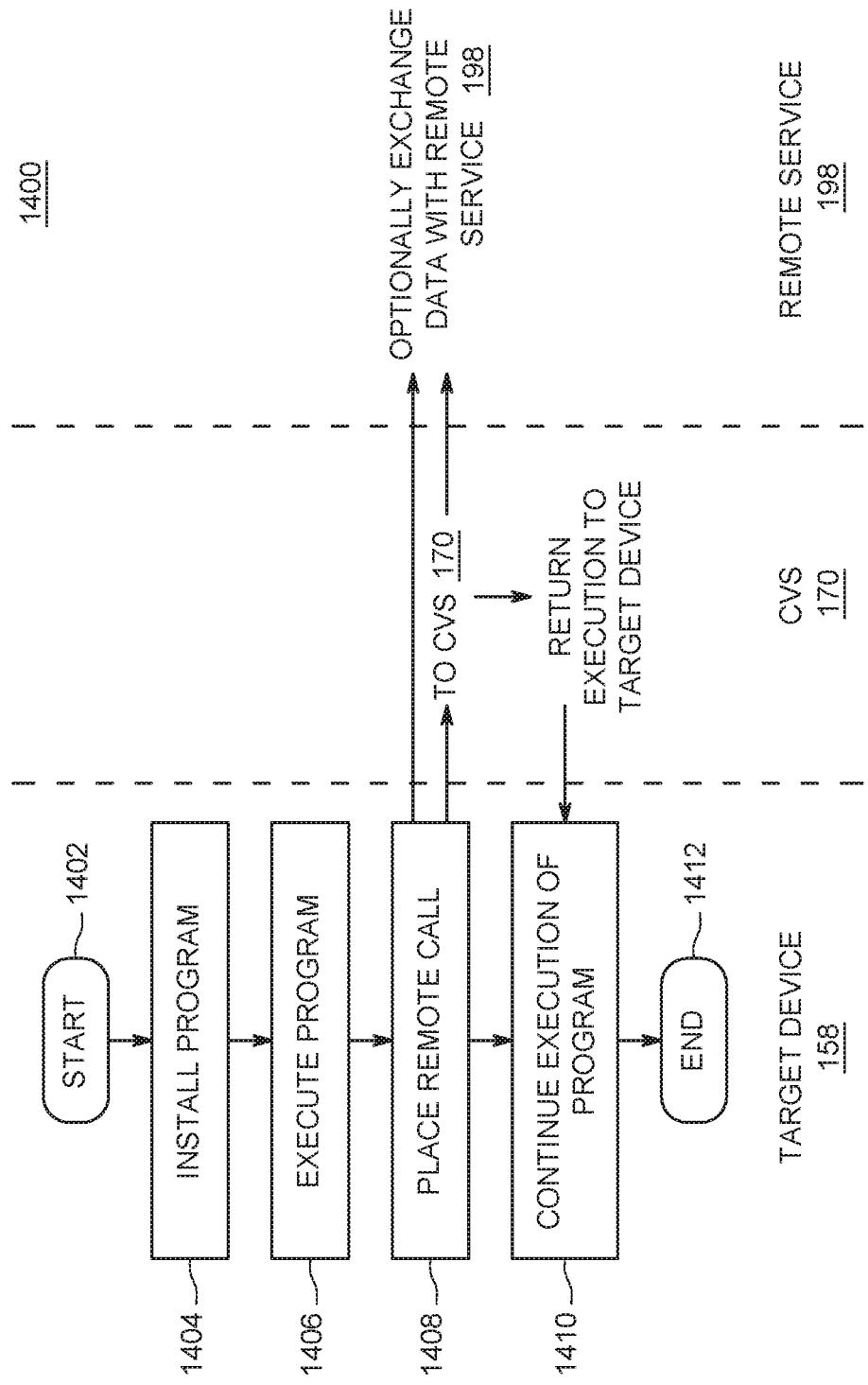

METHOD AND APPARATUS FOR AUTOMATICALLY GENERATING AND INCORPORATING CODE IN DEVELOPMENT ENVIRONMENTS

CROSS-REFERENCE TO RELATED APPLICATION

This application claims the benefit of the U.S. Provisional Application No. 62/471,071, having the same title and filed on Mar. 14, 2017, the contents of which are hereby incorporated by reference in its entirety.

BACKGROUND

Field

Embodiments described herein generally relate to a method and apparatus for automatically generating and incorporating code in development environments.

Description of the Related Art

While composing a program (or "programming") in a development environment (DE), programmers add one or more functionalities to a program. The users may code such functionalities themselves using the DE. However, coding functionalities for a wide variety of target devices for which the program is being created in the DE can be challenging for an average user who is not an expert in programming. Different target devices may have different system requirements for supporting implementation of a function. Even a user expert in one programming language, or in programming for one type of target device may find it challenging to create fully functional and optimized programs in a variety of programming languages, and/or for a variety of target devices.

Further, programming for target devices such as field programmable gate arrays (FPGAs) and other controller-based devices (e.g. microcontroller or microprocessor based devices), for example memory controller unit (MCU) and system on a chip (SoC) is even more complex, given the wide variety of device types, varied system requirements, configurations, applications, and programming languages used. To add to the complexity, such devices are deployed in remote locations, and usually adjunct to conventional systems, making programming for such target devices for adding functionalities very challenging for an average user.

Thus, there is a need in the art for simplifying programming in development environments, while automatically generating code for being incorporated in programs generated in such development environments.

SUMMARY

Embodiments described herein generally relate to a method and apparatus for automatically generating and incorporating code in development environments, substantially as shown in and/or described in connection with at least one of the figures, as set forth more completely in the claims.

These and other features and advantages of the present disclosure may be appreciated from a review of the following detailed description of the present disclosure, along with the accompanying figures in which like reference numerals refer to like parts throughout.

BRIEF DESCRIPTION OF THE DRAWINGS

So that the manner in which the above-recited features of the embodiments described herein can be understood in detail, a more particular description of the embodiments, briefly summarized above, may be had by reference to embodiments, some of which are illustrated in the appended drawings. It is to be noted, however, that the appended drawings illustrate only typical embodiments and are therefore not to be considered limiting of its scope.

FIGS. 7-12 depict GUI screens illustrating implementation of a method for automatically generating and incorporating code in development environments, according to the flow diagram of FIG. 6, in accordance with an embodiment;

FIG. 13 is a GUI screen for receiving inputs for generating a simple code for posting a message on TWITTER, in accordance with an embodiment; and FIG. 14 is a flow diagram of a method for illustrating execution of an automatically generated program executed by a target device of the system of FIG. 1, in accordance with an embodiment.

DETAILED DESCRIPTION

Figure 1:
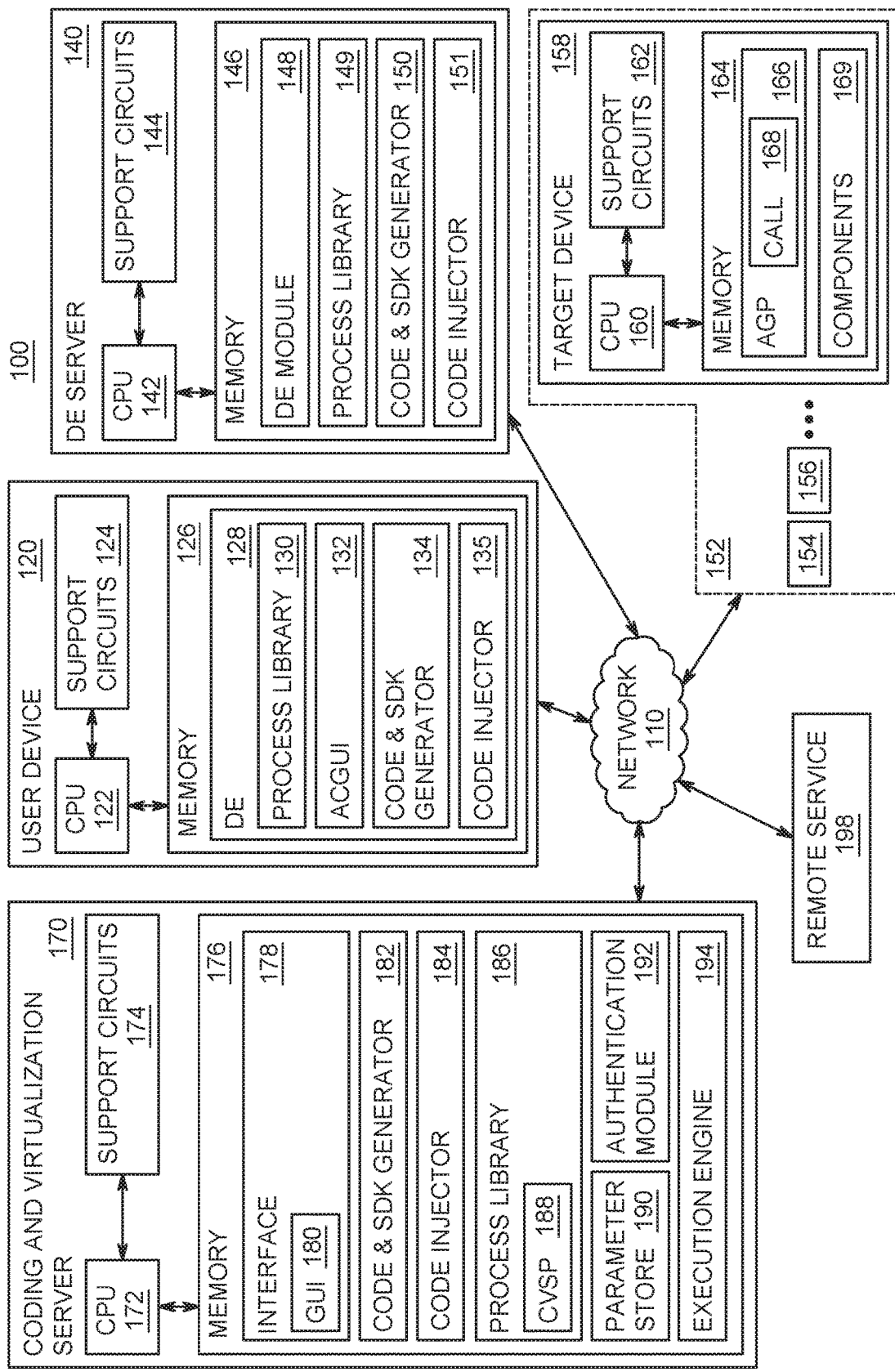
FIG. 1 is block diagram of a system for automatically generating and incorporating code in development environments, in accordance with an embodiment.

Embodiments described herein relate to method and apparatus for automatically generating and incorporating code in development environments, and more specifically to enabling automatic creation of code corresponding to a desired functionality, while a user is creating or composing a program for a target device in a development environment (DE), and to incorporating or injecting, manually or automatically, the automatically generated code in the program. The DE can be on a device remote to the target device, and for example, a web-based DE accessible via a browser. While programming or creating the program using the DE on the user device, the user accesses an automatic code generation user interface (ACGUI) on the user device. The ACGUI is available either in the context of the DE or as a separate interface from the DE. The ACGUI presents a library of available functionalities for which automatic generation of code is available. The ACGUI may be populated by a coding and virtualization server (CVS) remote to the user device, a process library stored on the user device, a process library stored local to the user device, or a process library stored on a server which hosts the DE on the user device, where the DE server may be local or remote to the user device.

The user selects a desired function in the ACGUI, specifies parameters and provides other inputs as may be required for the automatic generation of code for the desired function. Based on the provided inputs, the CVS automatically generates code corresponding to the desired function. The automatically generated code is then injected or otherwise incorporated, manually or automatically, into the program being created by the user on the DE. As used herein, the terms "inject" or "incorporate" are used interchangeably in the context of code being injected or incorporated in a program being developed for an application in a DE, and refer to appropriately importing the code into the program, such that the program including the automatically generated code may be executed without additional modifications. For example, the CVS and the DE are configured for the CVS to send the automatically generated code to the DE, in a manner configured by the user, or the automatically generated code generated is generated in the context of DE, and imported into a program being created in the DE based on user instructions from within the DE, or pre-defined instructions. The program comprising the automatically generated code, also referred to as automatically generated program (AGP) is then sent to the target device for installation and execution. In some embodiments, the functionality to generate code automatically, for example, code and software development kit (SDK) generator, is included in the DE on the user device, a device local to the DE, or the DE server remote to the DE. In some embodiments, the automatically generated code comprises a call from the target device to the CVS for executing a program on the CVS, referred to as the CVS program (CVSP), execution of which on the CVS performs the desired function. By executing the CVSP on the CVS, the call incorporated in the automatically generated code imparts additional functionality to the AGP. In some embodiments, the CVSP may further initiate a remote service executed by remote servers based on the call. In some embodiments, the call included in the automatically generated code is made from the target device directly to a device capable of performing the remote service, which also imparts additional functionality to the AGP.

Parameters and other inputs are also specified along with the desired function, and include information for operation of the automatically generated code on the target device such as target device type, power requirements, network equipment configuration, network details, authentication details for additional services or devices if required for execution of the desired function, among several other parameters and inputs as will be readily appreciated by persons skilled in the art. Parameters may also include information for operation of the call, for example, routing the call appropriately to the CVS or to a remote service. Parameters may also include information required for executing the CVSP or the remote service.

Commonly assigned U.S. Pat. No. 8,726,285, filed 28 Jan. 2011; U.S. Pat. No. 9,436,439, filed 17 Jun. 2014; U.S. Pat. No. 9,239,705, filed 17 Jun. 2014; U.S. Pat. No. 9,235,383, filed 17 Jun. 2014; and U.S. Patent Application Publication Numbers 2009/0070121, filed 11 Sep. 2007; 2009/0070162, filed 11 Sep. 2007; 2015/0199088, filed 9 Jan. 2015; 2015/0286362, filed 13 Apr. 2015; 2016/0327925, filed 8 Mar. 2016; 2016/0328216, filed 6 May 2016; 2017/0344921, filed May 24, 2016; and 2017/0180462, filed Dec. 21, 2016, each of which is incorporated herein by reference in their entireties, describe techniques for developing software for a device incorporating a controller, and executing, managing, reprogramming or changing the behavior of the software, e.g. remotely, to extend the capabilities of such a device via defined workflows.

These techniques function by generating, automatically, an entire program code or a code snippet in a desired programming language, for a desired platform, to enable the capability of performing a desired functional. If a code snippet is generated, it is incorporated or injected into a complete program, as desired. In some embodiments, the snippet or the entire program, when executed on a target device for which the program is generated, additionally places a call for one or more processes to be executed on a remote device, e.g., the CVS, and/or sends (directly or via the code virtualization server) data to a remote service provider, and/or further calls a function to be remotely performed on the data by the remote service provider. Embodiments described herein use these techniques to automatically generate code corresponding to a desired functionality, and inject such code in a program for a target device, where the program is created using a DE on a user device. With such embodiments, functionalities can be added conveniently while creating the program in a familiar DE. For example, in some embodiments, the functionalities may be added by accessing an ACGUI on the user device, where the ACGUI is separate from the DE. In some embodiments, the ACGUI is available in the context of the DE, thereby enabling a user to add functionalities without leaving the DE, greatly enhancing the ease with which functionalities may be programmed for target devices. Functionalities added in this manner, that is, via programs on devices remote to the target device and executed based on a call from the remote device, enhances the capabilities of the target device. For example, the target device may be incapable of performing such functionalities itself due to lack of processing resources, otherwise restricted in performing the functionality(ies), or in order to keep the functionalities updated by updating such programs on remote devices, without having to update the code on the target devices.

In some embodiments, the AGP, when executed on the target device, places calls to a remote device, for example the CVS, for executing the CVSP. In some embodiments, such calls from the controller device are made for interacting with one or more remote services, such as FACEBOOK (by FACEBOOK INC. of Menlo Park, Calif. TWITTER (by TWITTER INC. of San Francisco, Calif.), AMAZON (by AMAZON, INC. of Seattle, Wash.), data storage service, and the like, that are not provided by the CVS. The remote calls can be implemented as a call directly from the target device to the remote services, or as a call to a program on the CVS (CVSP), which in turn interacts with the remote services and provides the data to the target device for further execution of the AGP.

Embodiments described herein are thus capable of automatically generating and injecting code in development environments (DE), enabling a user or programmer to do from the same user device on which the DE is hosted. Non-limiting examples of DEs include Integrated Development Environments (IDE) such as ECLIPSE.ORG (by ECLIPSE FOUNDATION of Ottawa, Ontario, Canada), MICROSOFT VISUAL STUDIO (by MICROSOFT CORP. of Redmond, Wash.) and the like for generating programs, 3D Modeling editors and tools such as AUTODESK (by AUTODESK, INC. of San Rafael, Calif.), CINEMA 4D (by MAXON COMPUTER GMBH of Friedrichsdorf, Germany), ZBRUSH (by PIXOLOGIC, INC. of Los Angeles, Calif.) for designing objects and devices, and thereafter program such object or devices according to the embodiments described herein.

FIG. 1 is an overview diagram of a system 100 for automatically generating and injecting code in development environments, for example, for being injected in programs created for target device system 152, which may comprise one or more target devices (154, 156, . . . 158), and for example the target device 158. The target device system 152 may include the single target device 158, or may include several target devices in varied configurations such as (for example) master and slave configuration, gateway and edge configuration, mesh network, among several others as is generally known in the art. The system further includes a user device 120, a development environment (DE) server 140, a coding and virtualization server (CVS) 170, and a remote service 198 hosted by remote devices, each interconnected via a network 110.

The target device 158 comprises a CPU 160, support circuits 162 and a memory 164. The CPU 160 may be any commercially available processor, microprocessor, microcontroller, controllers including programmable sub-systems such as ARDUINO, TEXAS INSTRUMENTS LAUNCHPAD, FREESCALE BOARDS KINETIS, ST MICROELECTRONICS STM32, INTEL, AMD, and the like. The controllers may also be a System on a Chip (SoC) such as a RASPBERRY PI and the like. Some embodiments of controllers include programmed controllers of other assembled devices and systems such as NEST THERMOSTAT, PHILIPPS HUE, BELKIN, WITHINGS, and the like. The support circuits 162 comprise well-known circuits that provide functionality to the CPU such as a user interface, clock circuits, network communications, cache, power supplies, I/O circuits, and the like. In some embodiments, the user interface comprises a keypad, electronic buttons, speaker, touchscreen, display, camera, microphone, or other user interaction mechanisms. The memory 164 may be any form of digital storage used for storing data and executable software. Such memory includes, but is not limited to, random access memory, read only memory, disk storage, optical storage, and the like. The memory 164 stores computer readable instructions corresponding to an operating system (not shown), and an automatically generated program (AGP) 166 or a program AGP 166 comprising an automatically generated code snippet injected therein, optionally, a call 168, for example, a call to a function to be executed on a remote device such as the CVS 170 or a device for performing the remote service 198, and other code components 169, including program libraries, software development kit (SDK), necessary for executing the code including the AGP 166 and the call 168 included in the AGP 166. According to some embodiments, the AGP 166 is received from the CVS 170, or from the user device 120 or from the DE server 140, and installed in the memory 164.

The user device 120 comprises a CPU 122, support circuits 124 and a memory 126. The CPU 122 may be any commercially available processor, microprocessor, microcontroller, and the like. The support circuits 124 comprise well-known circuits that provide functionality to the CPU such as a user interface, clock circuits, network communications, cache, power supplies, I/O circuits, and the like. In some embodiments, the user interface comprises a keypad, electronic buttons, speaker, touchscreen, display, camera, microphone or other user interaction mechanisms. The memory 126 may be any form of digital storage used for storing data and executable software. Such memory includes, but is not limited to, random access memory, read only memory, disk storage, optical storage, and the like. The memory 126 stores computer readable instructions corresponding to an operating system (not shown), and a development environment (DE) 128, for example, for being used to generate a program for target devices, for example, the target device 158. The DE 128 provides a user interface to a user to create a program, for example, a program for execution on the target device 158. In some embodiments, the DE 128 is a standalone DE, installed on the user device 120. In some embodiments, the DE 128 is made available on the user device 120 via a DE server, accessible through the network 110, for example, a cloud DE server, or a DE server local to the user device 128, or a DE server otherwise communicably coupled to the user device 120. The DE 128 may also include a process library 130 and an automatic code generation user interface (ACGUI) 132 for receiving inputs from the user for automatically generating code to include in the program for the target device 158. In some embodiments, the process library 130 comprises code libraries, in different programming languages, corresponding to one or more functionalities made available for automatic code generation. In some embodiments, the process library 130 comprises an index of functionalities made available for automatic code generation. In some embodiments, the process library 130 comprises routines for optimal execution of the desired functionality according to one or more platforms, for example, routines for power management, network connectivity, errors management, sanity checks and the like. In some embodiments, the process library 128 may be updated by accessing a corresponding process library at a remote location, for example, to update the code libraries, or to include additional code corresponding to additional functionalities. In some embodiments, the DE 128 includes a code and SDK generator 134 for automatically generating code based on the inputs received via the ACGUI 132, using the process library 130. The DE 128 also includes a code injector 135 for injecting or incorporating code generated by the code and SDK generator 134 into the DE 128, and more specifically in context of a program being developed by a user (or developer) composing the program using the DE 128 on the user device 120. In some embodiments, the code injector 135 receives a selection of a location within the DE 128 (for example, via the ACGUI 132) or a location within the program, at which the automatically generated code needs to be injected to or incorporated at.

The DE server 140 comprises a CPU 142, support circuits 144 and a memory 146. The CPU 142 may be any commercially available processor, microprocessor, microcontroller, and the like. The support circuits 144 comprise well-known circuits that provide functionality to the CPU such as a user interface, clock circuits, network communications, cache, power supplies, I/O circuits, and the like. In some embodiments, the user interface comprises a keypad, electronic buttons, speaker, touchscreen, display, camera, microphone, or other user interaction mechanisms. The memory 146 may be any form of digital storage used for storing data and executable software. Such memory includes, but is not limited to, random access memory, read only memory, disk storage, optical storage, and the like. The memory 146 stores computer readable instructions corresponding to an operating system (not shown), and a development environment (DE) module 148, for providing a development environment to a user device, for example, the user device 120. The DE server 140 may be local or remote to the user device 120, or be configured as a cloud based DE server 140. The memory 146 also comprises a process library 149. In some embodiments, the process library 149 is made available as the process library 130 to the DE 128 of the user device 120. In some embodiments, the process library 149 comprises code libraries, in different programming languages, corresponding to desired functionalities, while the process library 128 comprises an index of such functionalities linked to the corresponding code in the process library 149. In some embodiments, the process library 149 comprises an index of functionalities made available for automatic code generation. In some embodiments, the process library 149 comprises routines for optimal execution of the desired functionality according to one or more platforms, for example, routines for power management, network connectivity, errors management, sanity checks and the like. In some embodiments, the process library 149 may be updated by accessing a corresponding process library at a remote location, for example, to update the code libraries, or to include additional code corresponding to additional functionalities. In some embodiments, the DE module 148 includes a code and SDK generator 150 for automatically generating code based on the inputs received via the ACGUI 132, using the process library 149. The memory 146 also includes a code injector 151 for injecting or incorporating code generated by the code and SDK generator 150 into the DE 128 (via the DE module 148), and more specifically in context of a program being developed by a user (or developer) using the DE 128 or a DE rendered using the DE module 148. In some embodiments, the code injector 151 receives a selection of a location within the DE 128 (for example, via the ACGUI 132) or the location within the program at which the automatically generated code needs to be injected to or incorporated at. In some embodiments, the DE server 140 is optional, and the DE 128 on the user device is sufficient in providing any required functionality of a development environment.

The CVS 170 comprises a CPU 172, support circuits 174, and memory 176 containing instructions and algorithms. The CPU 172 processes inputs and outputs to/from the devices. The CPU 172 may be any commercially available processor, microprocessor, microcontroller, and the like. The support circuits 174 comprise well-known circuits that provide functionality to the CPU such as a user interface, clock circuits, network communications, cache, power supplies, I/O circuits, and the like. Alternative embodiments may use control algorithms on a custom Application Specific Integrated Circuit (ASIC). In some embodiments, the user interface comprises a keypad, electronic buttons, speaker, touchscreen, display, camera, microphone, or other user interaction mechanisms. The memory 176 may be any form of digital storage used for storing data and executable software. Such memory includes, but is not limited to, random access memory, read only memory, disk storage, optical storage, and the like. The memory 176 stores computer readable instructions corresponding to an operating system (not shown), an interface 176, a code and software development kit (SDK) generator 182, a code injector 184, a process library 186, parameter store 190, authentication module 192, and an execution engine 194.

In some embodiments, the interface 178 is capable of producing a GUI 180 which may contain graphical widgets representing functions and/or widgets representing sequence of executing multiple functions. The GUI 180 is sent to user device 120 in real-time, pre-loaded to the user device 120, available as an application installable on the user device 120 by a user, or otherwise made available using known techniques, for presentation as the ACGUI 132 on the user device. Using the ACGUI 132 presented on the user device 120 in the context of DE 128, or in association with the DE 128 (e.g., by alternating between the DE 128 and the ACGUI 132), the user provides inputs regarding one or more of the desired solution. The input regarding the desired solution is received as input by the code and the SDK generator 182 to generate automatically, code corresponding to the desired functionality. In addition to receiving a selection of the desired functionality, the ACGUI 132 also receives parameters and other inputs at the user device 120, and such parameters and other inputs may be stored in the parameter store 190. The automatically generated code is generated by the code and SDK generator 182 using the process library 186, which comprises code templates corresponding to desired functionalities presented as available for automatic code generation via the ACGUI 132, and the parameter store 190, or parameter data received directly via the ACGUI 132. In some embodiments, the code and SDK generator 182 automatically generates a custom SDK for supporting the execution of the automatically generated code using the process library 186 and the parameters store 190. The custom SDK is also installed along with the automatically generated code on the target device 158, for example, as components 169. The code injector 184 injects or incorporates code generated by the code and SDK generator 182 into the DE 128, and more specifically in context of a program being developed by a user (or developer) using the DE 128 or a DE rendered using the DE module 148 on the user device 120. In some embodiments, the code injector 184 receives a selection of a location within the DE 128 (for example, via the ACGUI 132) at which the automatically generated code needs to be injected to or incorporated at.

The parameters include custom inputs to configure further the desired functionality, for example, for desired inputs/outputs, specific device(s) involved, specific connectivity, among several other operational parameters. A non-exhaustive list of parameters is presented in TABLE 1:

TABLE 1

| Type | Parameter | Example/Comments |
|---|---|---|
| General | Profile name | Name of a set of parameters (includes all sub-profiles) |
| Hardware Profile | Hardware type | Arduino Uno, Arduino Yun, Texas Instruments CC3200, Raspberry PI, etc. |
| Hardware Profile | Processor type | AVR, ARM, PIC, etc. |
| Hardware Profile | Network Hardware | Arduino Wifi Shield, Built-in Ethernet, Ethernet Shield, BLE Shield, Built-in BLE |
| Credential Profile | Username | Username for a webservice like FACEBOOK, . . . |
| Credential Profile | Password | Password for a webservice like FACEBOOK, . . . |
| Credential Profile | API Key | Developer API key given by webservices like FACEBOOK, . . . There can be several API keys |
| Credential Profile | API Secret | Developer API secret given by webservices like FACEBOOK, . . . There can be several API secrets |
| Connection | Connection | Allows to select different Connection profiles |

TABLE 1-continued

| Type | Parameter | Example/Comments |
|---|---|---|
| Profile | Profile name | |
| Connection Profile | Type | Wifi, Bluetooth, Zigbee, Z-WAVE, THREAD, LORA, 6LOWPAN, . . . |
| Connection Profile | Security Type | WPA, WEP, unsecured, . . . |
| Connection Profile | SSID | Wifi network identifier |
| Connection Profile | Password | Network password |
| Connection Profile | Transport Protocol | MQTT, CoAP, HTTP/S, TCP/IP. . . |
| Connection Profile | Role | Gateway or Edge |
| Setup Profile | Output Pin | Indicates which Output Pin is selected on the processor (multiple Output Pins can be selected) |
| Setup Profile | Input Pin | Indicates which Input Pin is selected on the processor (multiple Input Pins can be selected) |
| Setup Profile | Pin Rule | Specifies what rule is applied to a given Pin (Input or Output). For example: If Temperature = 19 then write High to Pin 12 |
| Input Profile | Required Input Parameter | Also called variable. Can be any parameter a choreo needs to be executed. Can be multiple Input Parameters. For example, a choreo sending an email will need Input Parameters like: Email address, Subject, Body, Attachment, . . . |
| Input Profile | Optional Input Parameter | Optional Input parameters are used to add Parameters that are not necessary. Multiple Optional Input Parameters are possible. For example, a choreo sending an email has optional Input Parameters like: CC, BCC or encryption type |

Such parameters may be stored in the parameter store 190, and utilized along with the process library 186 to generate code automatically at the CVS 170, or at the user device 120 or the DE server 140, where the information from the parameter store 190 is exchanged with the user device 120 or the DE server 140, respectively.

In some embodiments, the process library 186 is made available as the process library 130 to the DE 128 of the user device 120. In some embodiments, the process library 186 comprises code libraries, in different programming languages, corresponding to desired functionalities, while the process library 128 comprises an index of such functionalities linked to the corresponding code in the process library 186. In some embodiments, the process library 186 comprises an index of functionalities made available via the interface 178 to the ACGUI 132. In some embodiments, the process library 186 comprises routines for optimal execution of the desired functionality according to one or platforms, for example, routines for power management, network connectivity, errors management, sanity checks and the like. In some embodiments, the process library 186 may be used to update corresponding process library(ies) at a remote location(s), for example, to update the code libraries, or to include additional code corresponding to additional functionalities at the process library 130 or the process library 149.

In some embodiments, the ACGUI 132 also includes additional routines to allow for testing the automatically generated code or the entire program comprising the automatically generated code and various routines associated with the code. Such additional routines may include modules, for example, for simulating target devices, and executing the automatically generated code on the simulated target devices. The additional routines may also include modules for displaying the results of the aforesaid testing. The testing may be initiated upon receiving such instructions via the ACGUI. The results of the testing are displayed, for example, on the user device in the ACGUI. The testing results may be displayed live, that is, when the testing is being conducted, displaying outcomes of the testing as the outcomes occur. In some embodiments, the ACGUI 132 is used by the user to modify or reprogram the automatically generated code. In some embodiments, the ACGUI 132 is configured to track the automatically generated code, its performance, any runtime errors, modifications made, and thereby manage such automatically generated code.

In some embodiments, the access to the user device 120 and/or the DE server 140 is enabled by an authentication module 192, which comprises preconfigured credentials allowing the CVS 170 to exchange data with the user device 120 and/or the DE server 140, and particularly with the DE 128.

In some embodiments, the automatically generated code, for example, generated at the CVS 170, the user device 120, or the DE server 140 according to the techniques described herein, comprises a call to the CVS 170 from the target device 158 to execute a CVS program (CVSP) 188 at the CVS 170. The process library 188 also includes one or more such CVSPs.

The execution engine 194 supports all the foregoing functions of the CVS, including rendering the GUI 180 to the user device 120 as the ACGUI 132 (if the GUI 180 is sent to the user device 120 in real-time), executing CVSP 188, exchanging data with a remote service 198, among several others.

The remote service 198 is a service provided by a service provider device remote to the target device 158. For example, remote services include services provided by AMAZON, EBAY (by EBAY, INC. of San Jose, Calif.), FACEBOOK, APPLE PUSH NOTIFICATION (by APPLE, INC. of Cupertino, Calif.), text message servers, email servers, data storage, and the like.

The network 110 comprises the Internet, or a wide area network (WAN) or a combination, and may include one or more such networks. In some embodiments, the network 110 includes one to one communication channels between any two various components of the system. For example, between the user device 120 and the DE server 140, between the user device 120 and the CVS 170, between the DE server 140 and the CVS 170, or between the target device 158 and any of the user device 120, the DE server 140 or the CVS 170.

Figure 2:
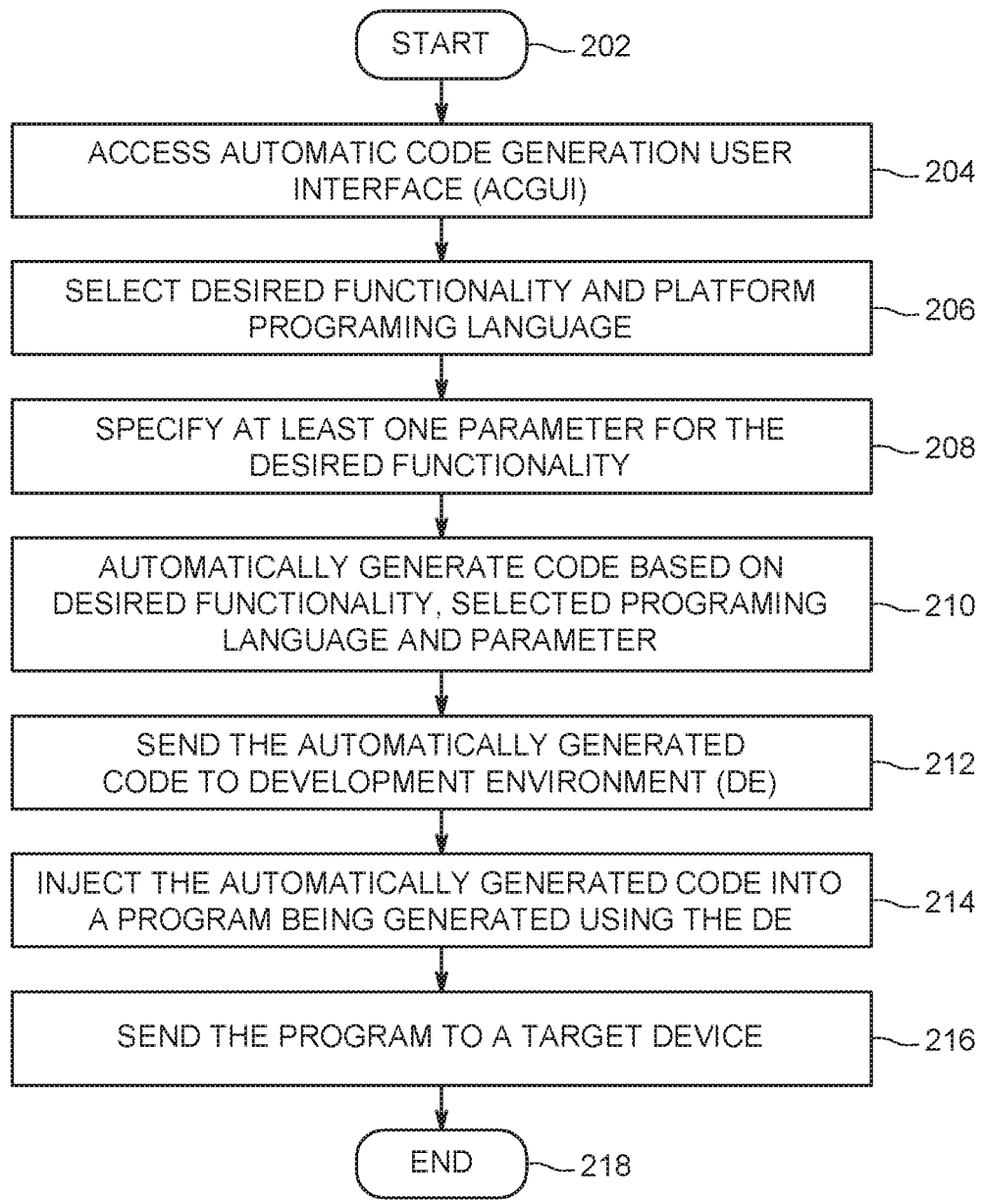
FIG. 2 is a flow diagram of a method for automatically generating and incorporating code in development environments as executed by one or more devices of the system of FIG. 1, in accordance with an embodiment.
Figure 3:
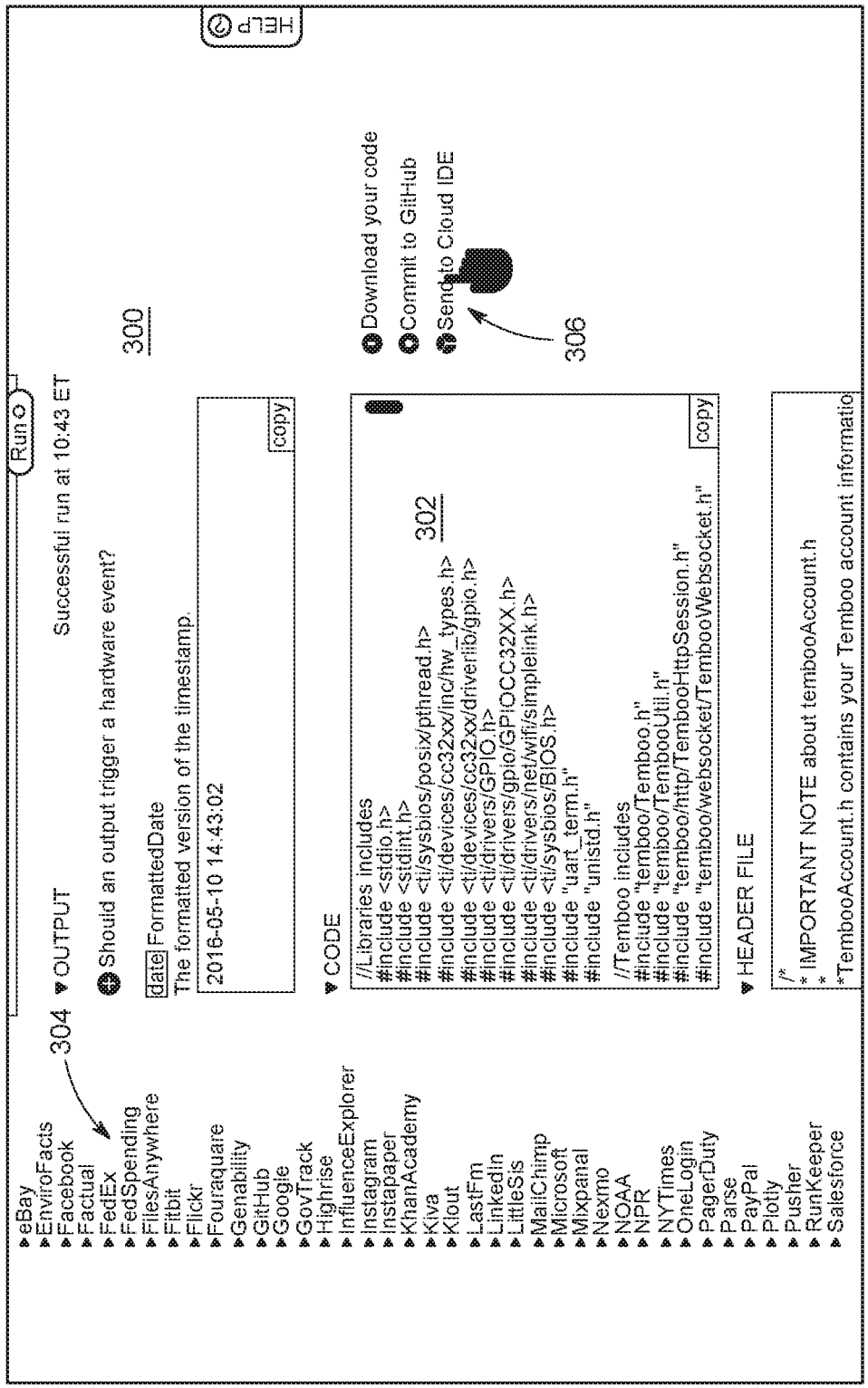
FIGS. 3-5 depict graphical user interface (GUI) screens associated with automatically generating and incorporating code in development environments, according to the flow diagram of FIG. 2, in accordance with an embodiment.
Figure 4:
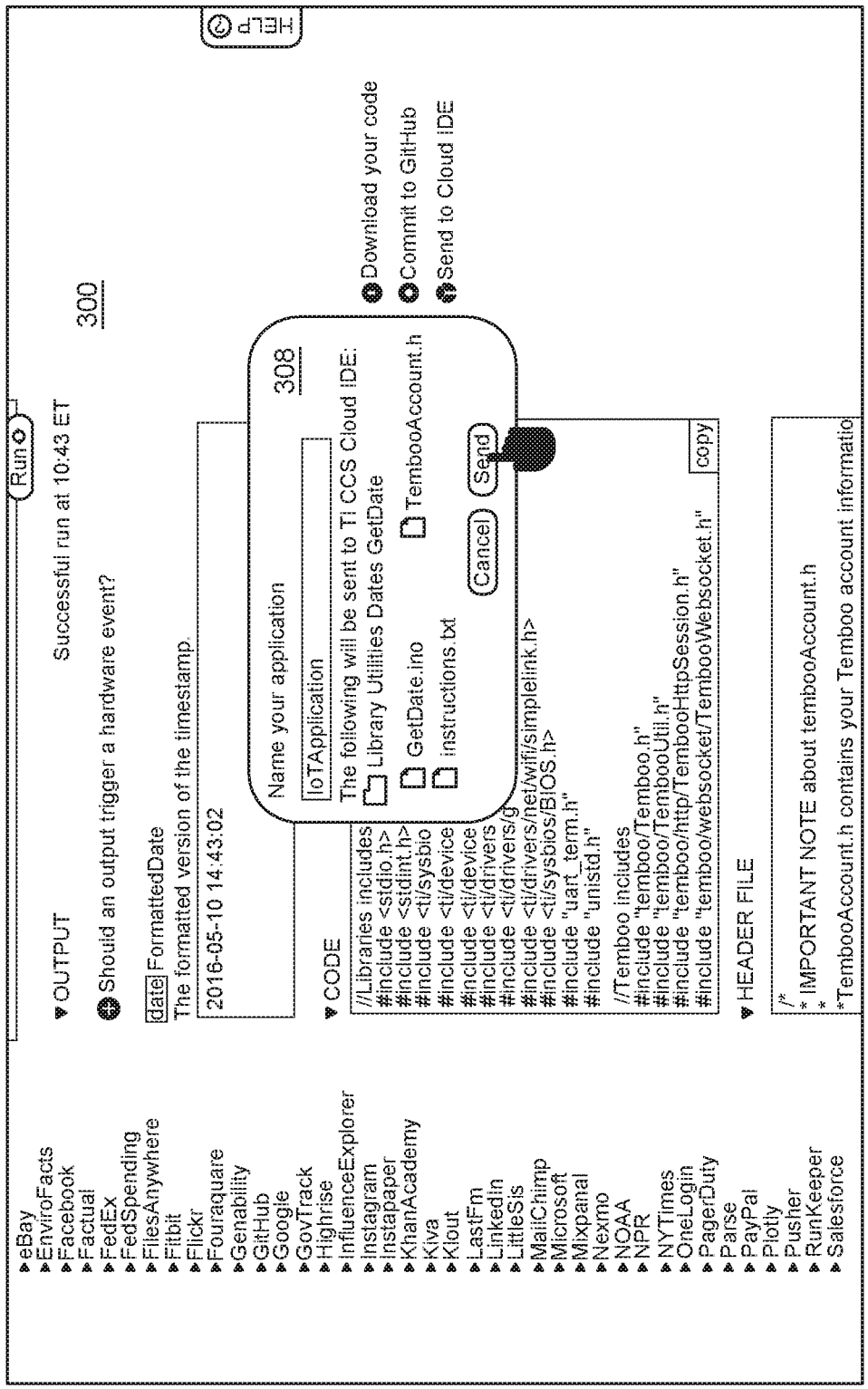
Figure 5:
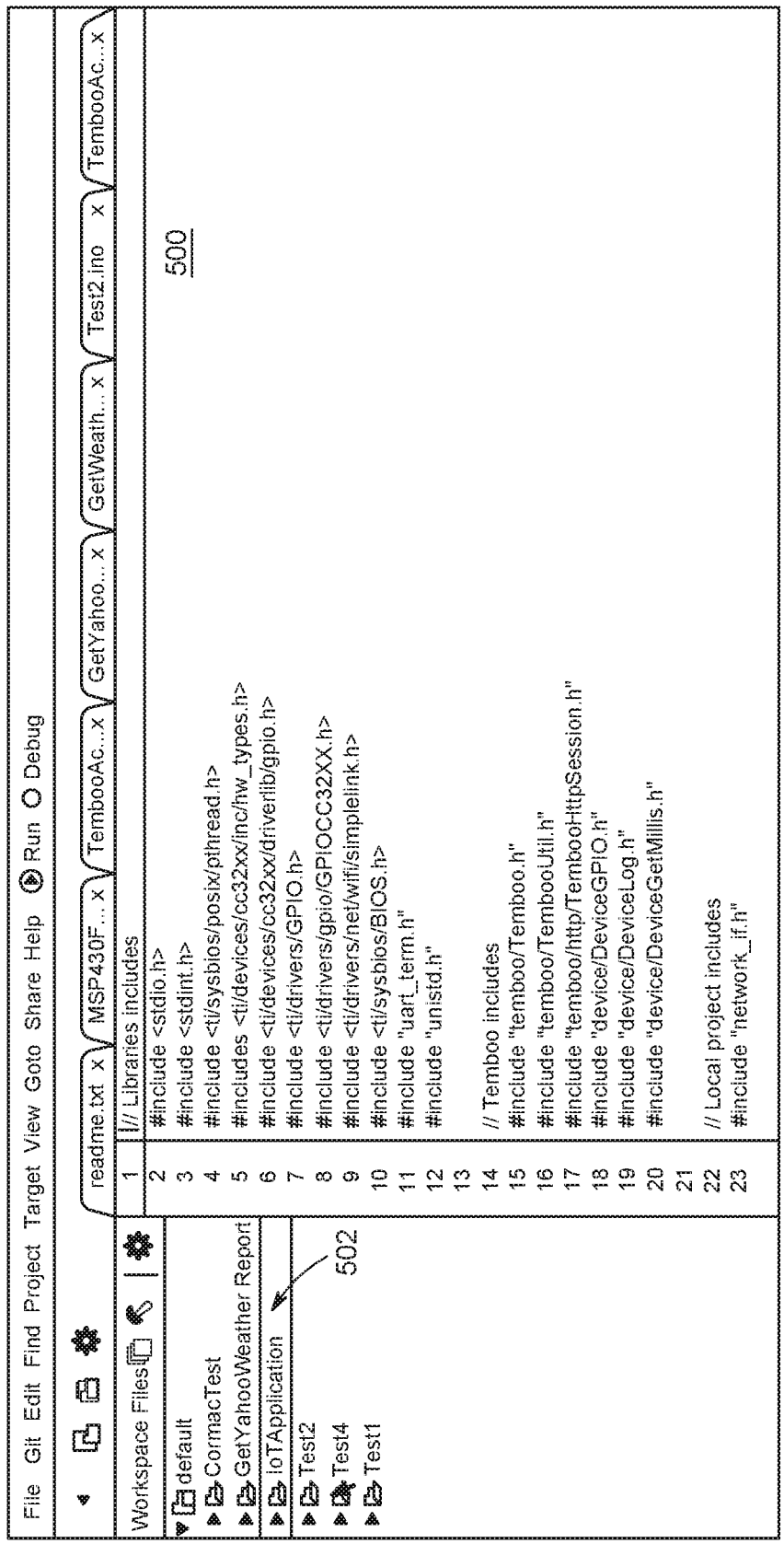

FIG. 2 depicts a flow diagram of a method 200 executed by the system 100 for automatically generating and injecting code in development environments, in accordance with embodiments described herein. In some embodiments, the method 200 is executed when a user, creating a program in the DE 128 on the user device 120 shifts focus to ACGUI 132, which is separate from the DE 128, in order to generate code automatically, and inject the automatically generated code into a program (AGP) for the target device 158. FIGS. 3-5 are graphical user interface (GUI) screens illustrating implementation of some of the steps of the method 200, and are referred in the context of the discussion of method 200.

The method 200 begins at step 202, and proceeds to step 204, at which the user accesses an automatic code generation user interface (ACGUI). The ACGUI, for example, the ACGUI 132 is rendered by the interface 178 of the CVS 170. The method proceeds to step 206, at which the user selects a desired function and a programming language in which to generate code automatically for enabling the selected functionality. The function is selected from multiple available functions for which code can be generated automatically. In some embodiments, the programming language is auto-detected or made available by the DE. The method 200 proceeds to step 208, at which the user specifies at least one parameter for the functionality, including operational routines as discussed above. The user may additionally select routines from a library of such routines, for example, incorporated in the process library, as discussed above, and presented via the ACGUI 132, for the desired functionality at step 208.

The method 200 proceeds to step 210, at which the method 200 generates code automatically for the desired functionality. For example, the code and SDK generator automatically generate code and supporting components (e.g. SDK) for the automatically generated code, using the code templates and routine definitions stored in the process library, the parameters received via the ACGUI or the parameter store 190. According to some embodiments, the automatically generated code comprises a call from the target device to a remote device to initiate a program or service on the remote device. The call is executed when the automatically generated code, as a program or a part of a program, is executed on the target device. For example, upon execution of the program on the target device, the call is placed from the target device to the CVS, to initiate a CVSP for execution on the CVS. The call includes the at least one parameter, for example, usable for executing the CVSP. Automatically generated code is also illustrated in the GUI screen 300 of FIG. 3, box 302. Further, menu 304 illustrates a list of functionalities for which automatic generation of code is available, each of such functionalities also referred to as choreographies or "choreos."

The method 200 proceeds to step 212, at which the user manipulates the ACGUI 132 to send the automatically generated code to the DE 128 to be injected in the complete program developed using the DE 128. In the illustrations of FIGS. 3-5, the DE 128 is a cloud IDE. For example, the user selects the instruction link 306 "Send to cloud IDE," in the ACGUI 132 to send the automatically generated code to a user defined location in the DE 128 or within the program being composed in the DE 128. In some embodiments, the user inputs a desired location to send the automatically generated code. For example, the desired location may be within the context of an existing program being composed in the development environment or a file containing a program, thereby enabling the user to incorporate, integrate or inject the automatically generate code into the program code developed by the user, using the DE 128. For example, FIG. 4 illustrates box 308 in which the user inputs a location in a cloud IDE, for sending the automatically generated code, for example, as captured in the box 302 of FIG. 3. In the illustration of FIG. 4, the user generates a new location "IoT Application" in the cloud IDE. Accordingly, at step 212, the method 200 sends the automatically generated code to the selected location, for example, a folder in the IDE. FIG. 5 illustrates a GUI screen 500 of the cloud IDE, in which the automatically generated code of box 302 shown in FIG. 3 has been received at a corresponding location 502 "IoT Application" in the cloud IDE. The method 200 proceeds to step 214, at which the automatically generated code is injected in the program being created using the DE 128. For example, the user may inject the automatically generated code received from the ACGUI 132 to the DE 128 into a program the user is developing using the DE 128, to generate a completed program at the DE 128. In some embodiments, the automatically generated code is injected into the program based on pre-defined instructions, for example by a code injector, such as the code injector 135. The code injector 135 comprises instructions to inject the code generated automatically by the code and SDK generator, into a program being developed in the DE. In some embodiments, the code injector may be a part of the code generator on any of the user device 120, the DE server 140 or the CVS 170. The completed program comprising the automatically generated code injected therein is referred to as automatically generated program (AGP). Further, in some embodiments, the automatically generated code (or AGP) is configured to place a call to a program (CVSP) on the CVS, upon being executed on the target device 158.

The method 200 proceeds to step 216, at which the method 200 sends the AGP to the target device 158. The method 200 then ends at step 218.

Figure 6:
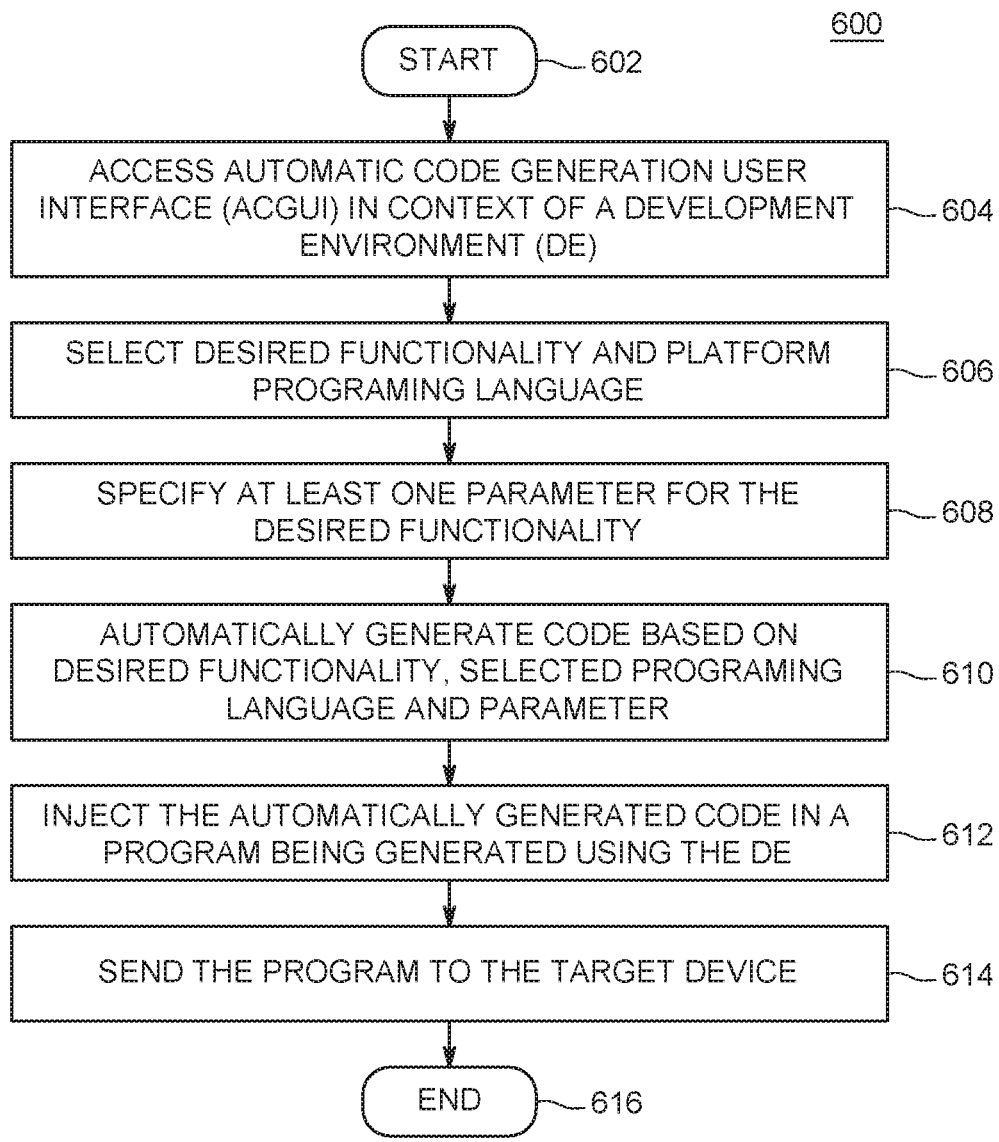
FIG. 6 is a flow diagram of a method for automatically generating and incorporating code in development environments as executed by one or more devices of the system of FIG. 1, in accordance with an embodiment.

FIG. 6 is a flow diagram of a method 600 for automatically generating and injecting code in development environments as executed by the system of FIG. 1, in accordance with an embodiment. In some embodiments, the method 600 is executed when a user, creating a program in the DE 128 accesses the ACGUI 132 within the context of the DE 128, for example, via a context menu in the DE 128. In such embodiments, the user does not need to exit the DE 128, and can inject automatically generated code for the desired functionality in a program being generated on the DE 128, directly from within the DE 128. FIGS. 7-12 are exemplary graphical user interface (GUI) screens illustrating implementation of some of the steps of the method 600, and are referred in the context of the discussion of method 600.

Figure 7:
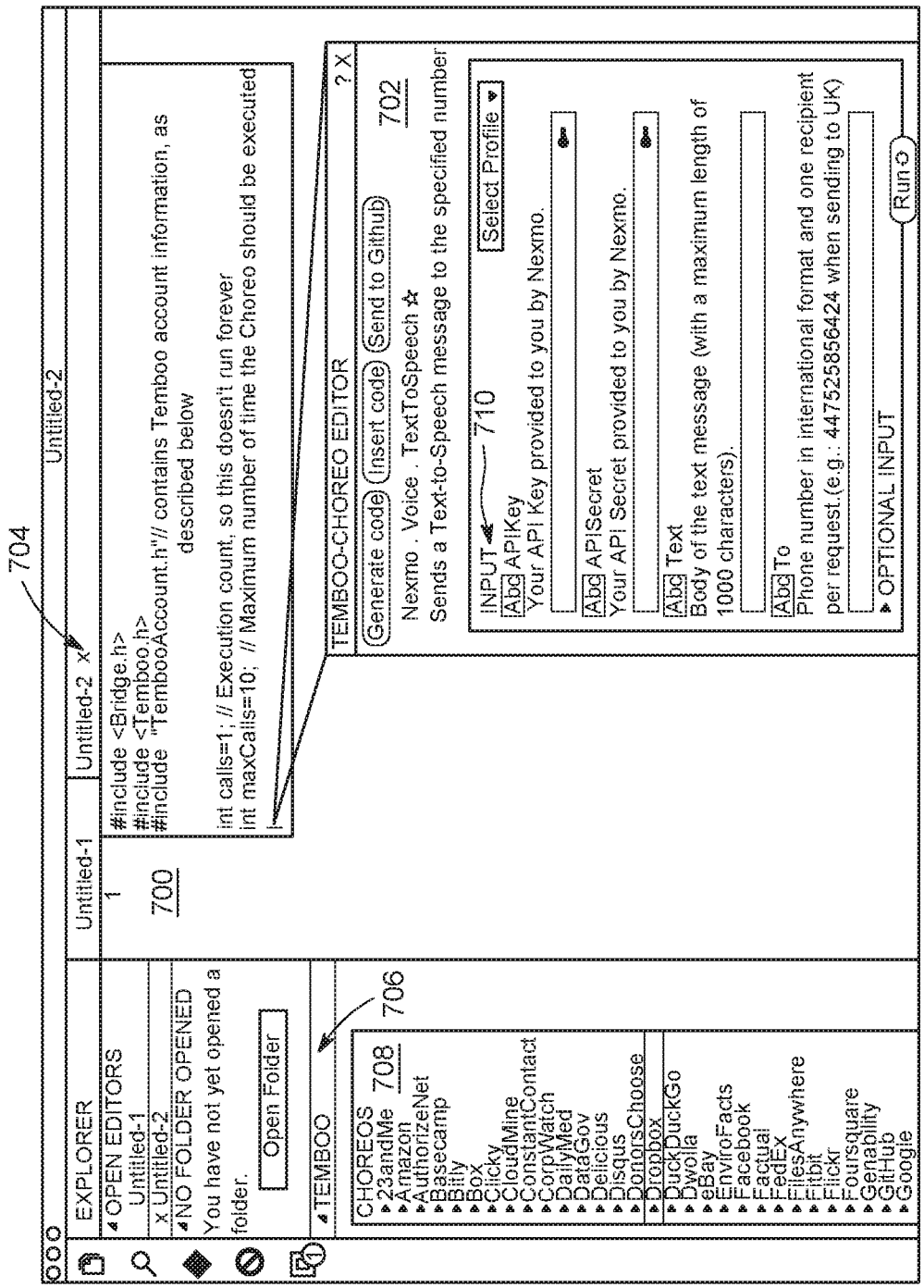
Figure 8:
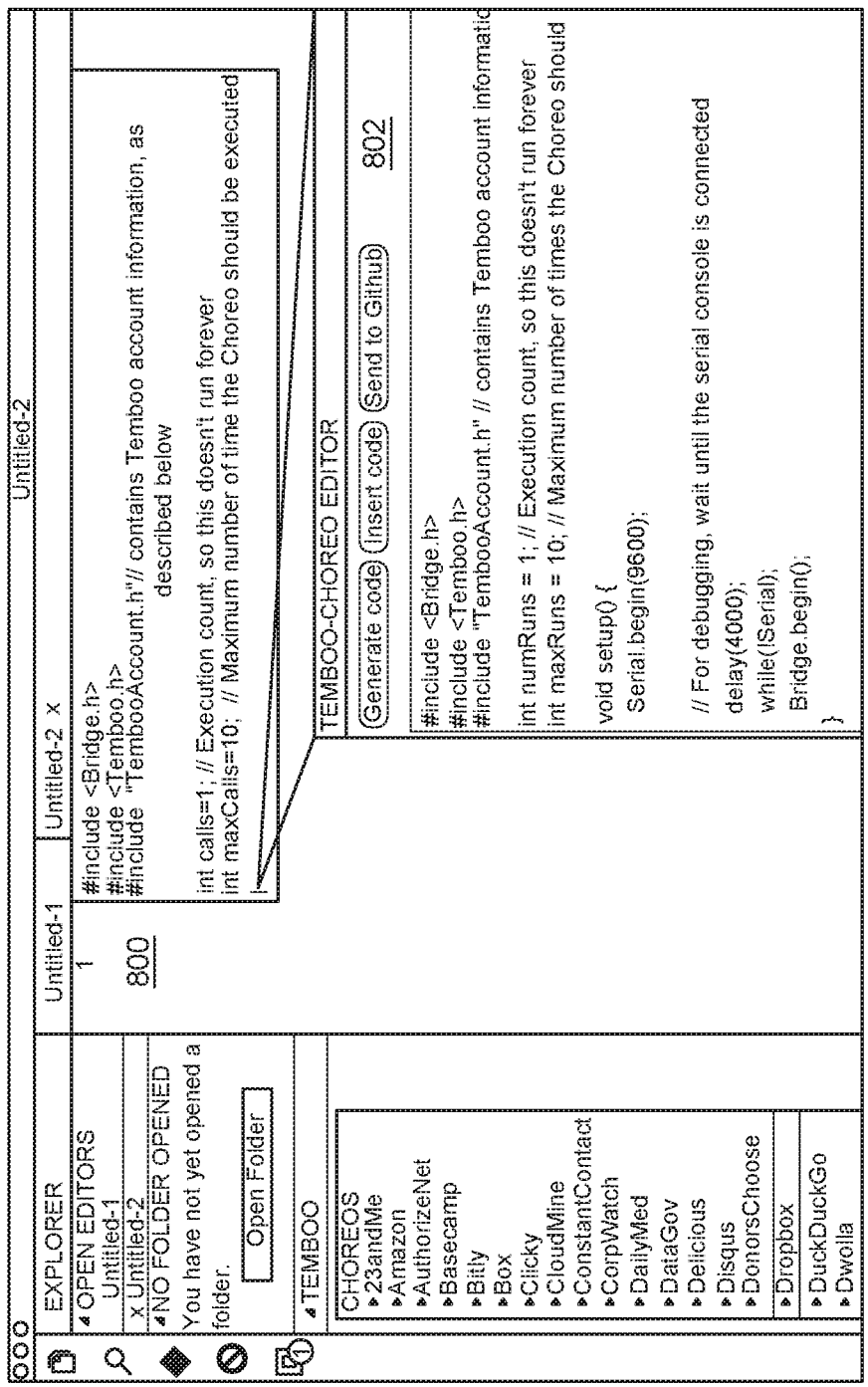
Figure 10:
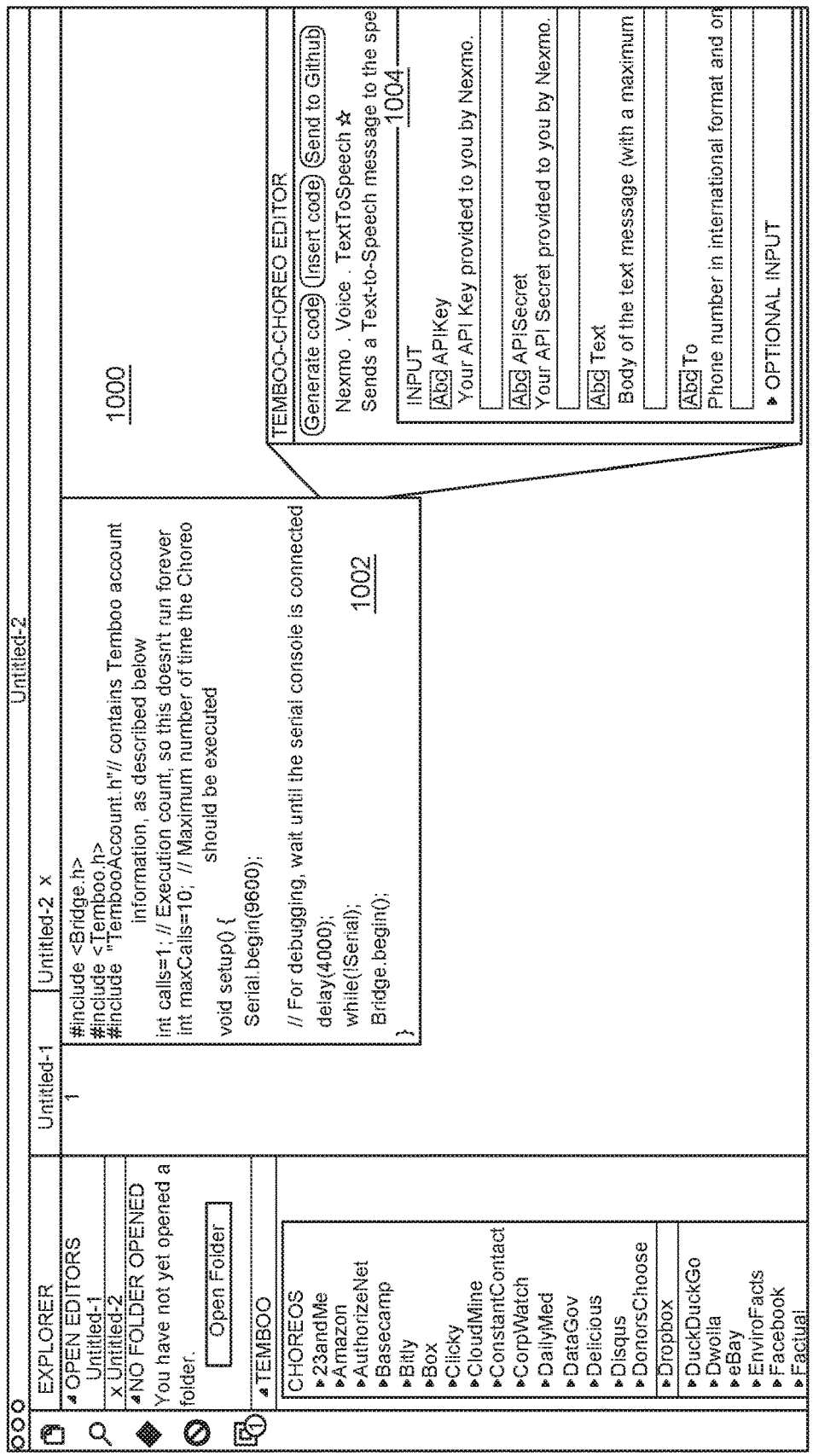

The method 600 begins at step 602, and proceeds to step 604, at which the user, in the DE 128, invokes the ACGUI 132, for example, by activating a context menu within the DE 128. For example, the GUI screen 700 of FIG. 7 shows a first ACGUI screen 702 opened in the context of a program, in a programming tab 704 titled "Untitled-2." Another technique to access an ACGUI screen would be to expand a placeholder 706 for ACGUI, to display a menu 708 of the available functionalities. The method 600 proceeds to step 606, at which the user selects a desired function, for example, the menu 708, or specifying directly, for example, within the context of the program 704. The function is selected for multiple available functions for which code can be generated automatically. The method 600 may also receive a selection of a programming language in which to generate code automatically for enabling the selected functionality. In some embodiments, the programming language is auto-detected or made available by the DE. The method 600 proceeds to step 608, at which the user specifies at least one parameter for the functionality, including operational routines as discussed above. For example, the parameters may be entered in the several data entry boxes in the "INPUT" field 710 of the ACGUI screen 702. The user may additionally select routines from a library of such routines, for example, incorporated in the process library, as discussed above, and presented via the ACGUI 132, for the desired functionality at step 608.

The method 600 proceeds to step 610, at which at which the method 600 generates code automatically for the desired functionality. For example, the code and SDK generator automatically generate code and supporting components (e.g. SDK) for the automatically generated code, using the code templates and routine definitions stored in the process library, the parameters received via the ACGUI or the parameter store 190. According to some embodiments, the automatically generated code comprises a call from the target device to a remote device to initiate a program or service on the remote device. The call is executed when the automatically generated code, as a program or a part of a program, is executed on the target device. For example, upon execution of the program on the target device, the call is placed from the target device to the CVS, to initiate a CVSP for execution on the CVS. The call includes the at least one parameter, for example, usable for executing the CVSP. Automatically generated code is then automatically populated within the DE 128, for example, as illustrated in the GUI screen 800 of FIG. 8, ACGUI box 802, which further allows editing of the automatically generated code by the user, if so desired.

The method 600 then proceeds to step 612, at which the automatically generated code is injected in the program generated using the DE 128, for example by a code injector, such as one of the code injectors 135, 151 or 184. The code injector comprises instructions to inject the code generated automatically by the code and SDK generator, into a program being developed in the DE. In some embodiments, the code injector may be a part of the code generator on any of the user device 120, the DE server 140 or the CVS 170. For example, FIG. 9 illustrates a GUI screen 900 showing the programming tab 902 including the automatically generated code, according to various embodiments. In some embodiments, for example, FIG. 10, the GUI screen 1000 illustrates that a ACGUI 1004 is invoked from the programming tab 1002, to edit the automatically generated program injected in the program generated using the DE 128.

Figure 11:
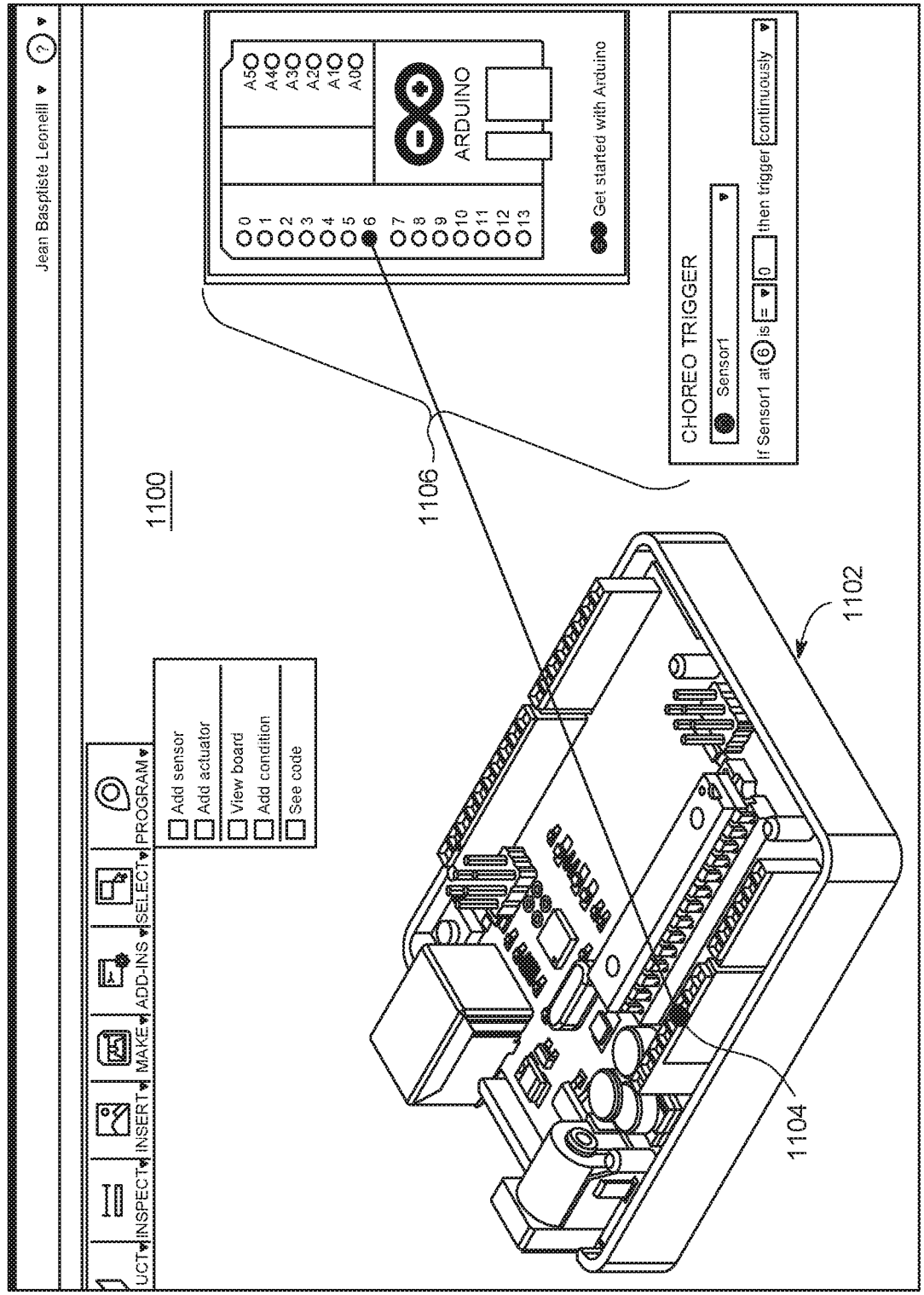
Figure 12:
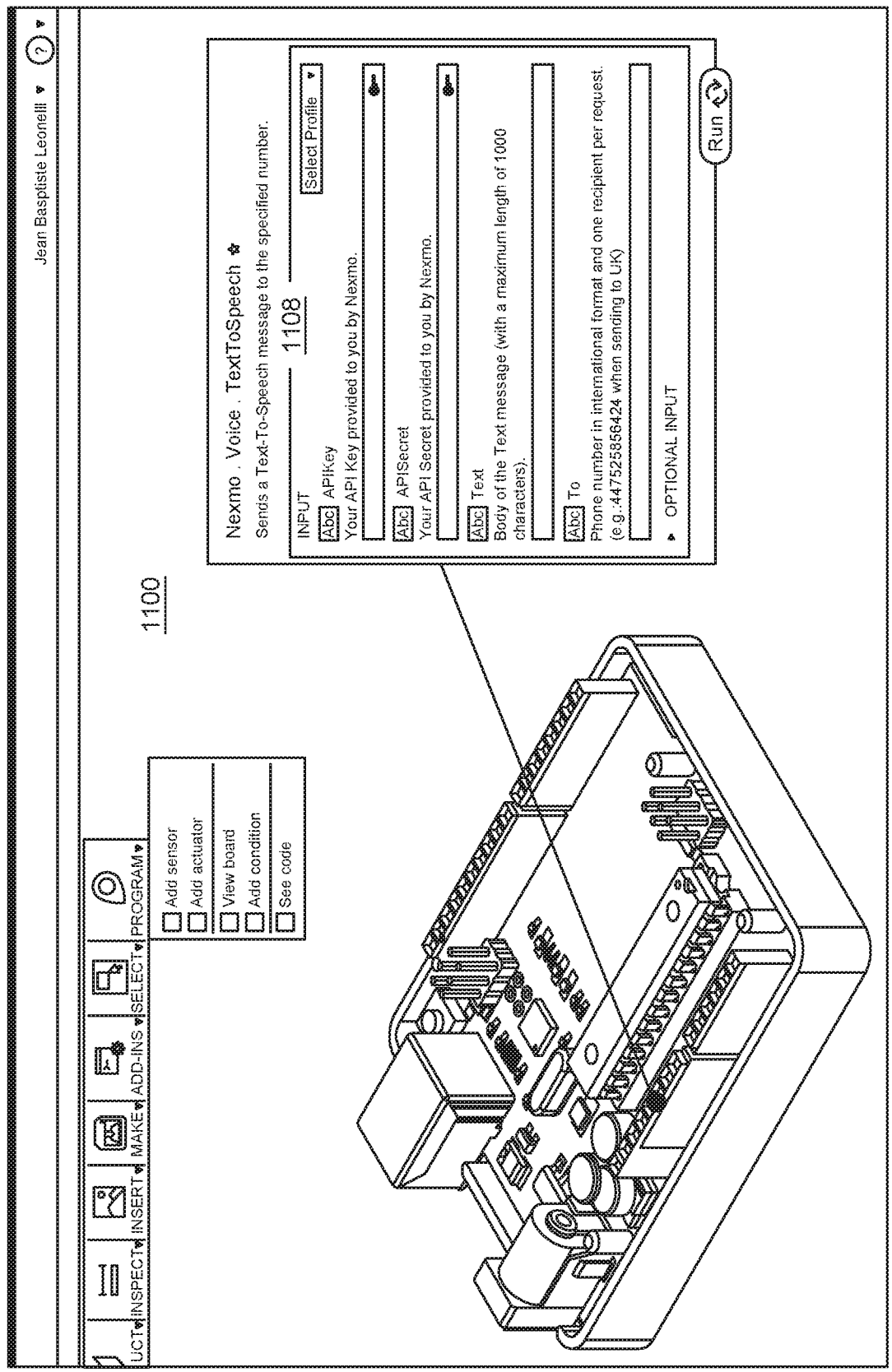

The ability to generate code automatically, while staying within the context of a DE has several applications in addition to those described above. For example, FIG. 11 illustrates a graphical design tool DE 1100, in which a programmable electronic device (PED) 1102, for example, field programming gate arrays (FPGAs), devices comprising a digital controller, MCUs, CPUs, Sensors, Actuators, Inducers, SoCs, among other programmable devices, is being designed. To generate code automatically for a component while designing the PED 1102, for example, for adding a functionality to pin 6 indicated by numeral 1104, the user activates context menu to display ACGUI screen 1106. As shown in FIG. 12, using a screen of ACGUI 1108, the user may select desired functionality (e.g. "Nexmo," a service provided by VONAGE, located in New Jersey), programming language (not shown), specify configuration of the pin 6 1104 of the PED 1102 (the target device), thereby providing the information needed for the automatic generation of code to the code and SDK generators via the ACGUI. In this manner, code is generated automatically for desired functionalities and injected within a program being generated in the DE, for example DE 128. The automatically generated code comprises a call to perform the Nexmo functionality selected above, and the call includes information for performing the service, for example, one or more parameter(s) usable for performing the Nexmo service.

The method 600 proceeds to step 614 at which the method 600 sends the AGP to the target device 158. The method 600 then ends at step 616.

In some embodiments, the user has an option to edit the automatically generated code, one or more parameters, or change the function for which the automatically generated code is generated. For example, the user can select the automatically generated code using the ACGUI, and edit the automatically generated code, or the parameters. In some embodiments, the user can select a different function from the multiple available functions, and generate code automatically for this different function, which is then inserted in the program for the target device, for example, using one or more steps of the methods 200 or 600.

As another example, FIG. 13 shows a screen of an ACGUI 1300 for receiving inputs, including parameters, for generating a simple code for posting a message on TWITTER. The ACGUI 1300 may be accessed alongside a development environment for Java such as ECLIPSE.ORG (method 200), or in the context of ECLIPSE.ORG (method 600). The code is generated automatically, for example, by any of the code and SDK generators (134, 150, 182), as follows:

```
TembooSession session = new TembooSession("demo", "myFirstApp", "7d7567f-e76147c7-8");
SendDirectMessage sendDirectMessageChoreo = new SendDirectMessage(session);
// Get an InputSet object for the choreo
SendDirectMessageInputSet sendDirectMessageInputs = sendDirectMessageChoreo.newInputSet( );
// Set credential to use for execution
sendDirectMessageInputs.setCredential("TwitterCredentials");
// Set inputs
sendDirectMessageInputs.set_ScreenName("@testuser");
sendDirectMessageInputs.set_Text("Hello!!!!");
// Execute Choreo
SendDirectMessageResultSet sendDirectMessageResults = sendDirectMessageChoreo.execute(sendDirectMessageInputs);
```

The automatically generated code is injected by a code injector (135, 151, 184) into an app or a program being developed in ECLIPSE.ORG using Java, for example, based on user instructions, or automatically, according to the methods 200 or 600.

FIG. 14 is a flow diagram of a method 1400 illustrating execution of an automatically generated program (AGP) executed by the system of FIG. 1, already sent to the target device, in accordance with an embodiment. The method 1400 begins at step 1402 and proceeds to step 1404 at which the method 1400 installs the program (AGP) developed on the IDE (of the user device), comprising the automatically generated code according to the embodiments described herein, on the target device 158. The method 1400 proceeds to step 1406, at which the method 1400 begins executing the AGP, and at step 1408, the method 1400 places a call to a remote device, for example, from the target device 150 to the CVS 170 for executing a process CVSP on the CVS 170, or from the target device 150 to the remote service 198 directly. In some embodiments, execution of the CVSP or the remote service further exchanges data with the remote service 198. In some embodiments, the CVSP returns data (from execution of the CVSP or the remote service 198) to the AGP. The method 1400 proceeds to step 1410, at which the method 1400 continues execution of the AGP. In some embodiments, the method 1400 waits for receipt of data or instruction from the CVS 170 or the remote service 198 to the target device 158, while in some embodiments, the method 1400 continues execution of the AGP without waiting for any data from the CVS 170 or the remote service 198. The method 1400 proceeds to step 1412, at which the method 1400 ends.

The ACGUI may take various forms to provide tools for receiving inputs for designing, testing, monitoring, and modifying controller based solutions for application systems. The ACGUI may include selectable text, form fields, icons representing elements or parameters of the solution, widgets representing functions and the sequence of execution thereof, graphs and tables to display a state of the solution, among several other elements used in GUIs for the purpose of receiving inputs and presenting information or outputs. As would occur readily to those of ordinary skill, several such variations of the GUIs may be used in order to practice the embodiments described, without departing from the scope and spirit of the embodiments described herein. While the embodiments are described with respect to Internet of things (IoT) devices, those skilled in the art will readily appreciate that the techniques exemplified by the disclosed embodiments are applicable to several other programming environments and devices, including mobile, desktop, server, web-based applications.

The embodiments directed herein may be directed to any programming languages or frameworks, including, but not limited to JAVA, C, C #, IOS, PHP, ANDROID, JAVASCRIPT, NODE.JS, RUBY, PYTHON, among several others. The target device could be any processor based device, and the automatically generated code could be used could be used as, or when generating code for insertion into, applications for IoT, mobile, web, desktop, and server devices. While reference to IoT devices, programs and parameters is made as an example, the embodiments described herein are not limited to such examples. Those of ordinary skill would appreciate that the embodiments described herein are applicable to programming for various other processor based devices equally well, which are within the scope and spirit of the present invention. For example, embodiments described herein are usable to build a desktop application, and in some embodiments, the desktop application so generated may be installed on user device, that is, in such a scenario, the user device and target device would be the same. In some embodiments, the embodiments described herein are usable to build a web application installed on a web server, which is the target device in this example.

The methods described herein may be implemented in software, hardware, or a combination thereof, in different embodiments. The methods may be incorporated in processor executable instructions stored on non-transitory computer readable media. In addition, the order of methods may be changed, and various elements may be added, reordered, combined, omitted or otherwise modified. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

While the foregoing is directed to embodiments described herein, other and further embodiments may be devised without departing from the basic scope thereof, and the scope thereof is determined by the claims that follow.

The invention claimed is:

1. A computer-implemented method for automatically generating and incorporating code in a development environment (DE), the method comprising:
while a program for a target device is being composed using the DE on a user device,
displaying an automatic code generation user interface (ACGUI) on the user device, separate from the DE or in a context of the DE;
receiving, via the ACGUI, a selection of a function from a plurality of available functions for generating code automatically corresponding to the selected function;
receiving at least one parameter for executing the automatically generated code to perform the function;
automatically generating the code in the ACGUI based on the selected function and the at least one parameter,
the automatically generated code configured to perform the selected function upon execution of the automatically generated code on the target device;
incorporating the automatically generated code in the program for the target device;
sending the program to the target device for installation and execution on the target device, wherein the user device is remote to the target device; and
receiving, on the ACGUI on the user device, instructions to initiate testing of the automatically generated code.

2. The method of claim 1, wherein the automatically generated code comprises a call from the target device to a code virtualization server (CVS) for executing a CVS program (CVSP) on the CVS to perform the function, the call comprising the at least one parameter,
wherein the CVSP is executed on the CVS using the at least one parameter,
wherein the CVS is remote to the user device and the target device, and
wherein the at least one parameter is received via the ACGUI, or via a file stored on at least one of the user device or the CVS.

3. The method of claim 2, further comprising:
receiving, at the CVS from the target device, the call for executing the CVSP, the call comprising the at least one parameter for executing the CVSP;

executing the CVSP on the CVS using the at least one parameter; and optionally returning data, from the execution of the CVSP, from the CVS to the target device.

4. The method of claim 1, wherein the automatically generated code comprises a call from the target device to a remote service provided by a device remote to the user device and the target device, the remote service configured to perform the function, the call comprising the at least one parameter, wherein the remote service is executed using the at least one parameter.

5. The method of claim 4, further comprising:

receiving, at the remote device from the target device, the call for executing the remote service, the call comprising the at least one parameter for executing the remote service, executing the remote service using the at least one parameter, and optionally returning data, from the execution of the remote service, from the remote device to the target device.

6. The method of claim 1, further comprising:

receiving, via the ACGUI, a selection of a location in the program to insert the automatically generated code, wherein the incorporating the automatically generated code in the program is based on the received selection of the location.

7. The method of claim 1, further comprising:

after the incorporating the automatically generated code in the program, receiving, in the ACGUI, an instruction to edit the automatically generated code;

displaying, in the ACGUI, at least one of an option to edit the automatically generate code, or an option to edit the at least one parameter;

receiving instructions to edit at least one of the automatically generated code, or the at least one parameter;

modifying the automatically generated code based on the received instructions to edit the at least one of the automatically generated code, or the at least one parameter to yield an automatically generated modified code;

incorporating the automatically generated modified code in the program for the target device; and sending the program to the target device for installation and execution on the target device.

8. The method of claim 1, further comprising:

after the incorporating the automatically generated code in the program, receiving, in the ACGUI, an instruction to change the selected function and the automatically generated code corresponding thereto;

displaying, in the ACGUI, the plurality of available functions for automatic code generation;

receiving, via the ACGUI, a selection of a second function from the plurality of available functions for generating a second code automatically corresponding to the second function;

receiving at least one parameter for executing the automatically generated second code to perform the second function;

automatically generating the second code in the ACGUI based on the selected second function and the at least one parameter for executing the automatically generated second code, the automatically generated second code configured to perform the second function upon execution of the automatically generated second code;

incorporating the automatically generated second code in the program for the target device; and sending the program to the target device for installation and execution on the target device.

9. The method of claim 1, further comprising initiating testing of the automatically generated code; and displaying results of the testing on the user device in the ACGUI.

10. A system for automatically generating and incorporating code in a development environment, the system comprising a user device, a target device and a code virtualization server (CVS), each remote to the other and communicably coupled via a network, the user device comprising at least one processor, and a memory comprising executable instructions, which when executed using the at least one processor executes a method comprising:

while a program for a target device is being composed using a development environment (DE) on a user device, displaying an automatic code generation user interface (ACGUI) on the user device, separate from the DE or in a context of the DE, receiving, via the ACGUI, a selection of a function from a plurality of available functions for generating code automatically corresponding to the selected function, receiving at least one parameter for executing the automatically generated code to perform the function, automatically generating the code in the ACGUI based on the selected function and the at least one parameter, the automatically generated code configured to perform the selected function upon execution of the automatically generated code on the target device, incorporating the automatically generated code in the program for the target device, sending the program to the target device for installation and execution on the target device, and receiving, on the ACGUI on the user device, instructions to initiate testing of the automatically generated code.

11. The system of claim 10, wherein the automatically generated code comprises a call from the target device to a code virtualization server (CVS) for executing a CVS program (CVSP) on the CVS to perform the function, the call comprising the at least one parameter, wherein the CVSP is executed on the CVS using the at least one parameter, wherein the CVS is remote to the user device and the target device, and wherein the at least one parameter can be received via the ACGUI or a file stored on at least one of the user device, or the CVS.

12. The system of claim 11, wherein the CVS comprises at least one processor and a memory comprising the CVSP, which is configured to perform a method comprising:

receiving, at the CVS from the target device, the call for executing the CVSP, the call comprising the at least one parameter for executing the CVSP, executing the CVSP on the CVS using the at least one parameter, and optionally returning data, from the execution of the CVSP, from the CVS to the target device.

13. The system of claim 10, wherein the automatically generated code comprises a call from the target device to a remote service provided by a device remote to the user device and the target device, the remote service configured to perform the function, the call comprising the at least one parameter, wherein the remote service is executed using the at least one parameter.

14. The system of claim 13, wherein the remote device providing the remote service is configured to perform a method comprising:

receiving, at the remote device from the target device the call for executing the remote service, the call comprising the at least one parameter for executing the remote service, executing the remote service using the at least one parameter, and optionally returning data, from the execution of the remote service, from the remote device to the target device.

15. The system of claim 10, further comprising:

receiving, via the ACGUI, a selection of a location in the program to insert the automatically generated code, wherein the incorporating the automatically generated code in the program is based on the received selection of the location.

16. The system of claim 10, further comprising:

after the incorporating the automatically generated code in the program, receiving, in the ACGUI, an instruction to edit the automatically generated code;

displaying, in the ACGUI, at least one of an option to edit the automatically generate code, or an option to edit the at least one parameter;

receiving instructions to edit at least one of the automatically generated code, or the at least one parameter;

modifying the automatically generated code based on the received instructions to edit the at least one of the automatically generated code, or the at least one parameter to yield an automatically generated modified code;

incorporating the automatically generated modified code in the program for the target device; and sending the program to the target device for installation and execution on the target device.

17. The system of claim 10, further comprising:

after the incorporating the automatically generated code in the program, receiving, in the ACGUI, an instruction to change the selected function and the automatically generated code corresponding thereto;

displaying, in the ACGUI, the plurality of available functions for automatic code generation;

receiving, via the ACGUI, a selection of a second function from the plurality of available functions for generating a second code automatically corresponding to the second function;

receiving at least one parameter for executing the automatically generated second code to perform the second function;

automatically generating the second code in the ACGUI based on the selected second function and the at least one parameter for executing the automatically generated second code, the automatically generated second code configured to perform the second function upon execution of the automatically generated second code;

incorporating the automatically generated second code in the program for the target device; and sending the program to the target device for installation and execution on the target device.

18. The system of claim 10, further comprising initiating test of the automatically generated code; and displaying results of the testing on the user device in the ACGUI.

19. A non-transitory computer readable medium comprising processor executable instructions to execute a method for automatically generating and incorporating code in a development environment (DE), the method comprising:

while a program for a target device is being composed using the DE on a user device, displaying an automatic code generation user interface (ACGUI) on the user device, separate from the DE or in a context of the DE;

receiving, via the ACGUI, a selection of a function from a plurality of available functions for generating code automatically corresponding to the selected function;

receiving at least one parameter for executing the automatically generated code to perform the function;

automatically generating the code in the ACGUI based on the selected function and the at least one parameter, the automatically generated code configured to perform the selected function upon execution of the automatically generated code on the target device;

incorporating the automatically generated code in the program for the target device;

sending the program to the target device for installation and execution on the target device, wherein the user device is remote to the target device; and receiving, on the ACGUI on the user device, instructions to initiate testing of the automatically generated code.

20. The non-transitory computer readable medium of claim 19, wherein the automatically generated code comprises either a call from the target device to a code virtualization server (CVS) for executing a CVS program (CVSP) on the CVS to perform the function, the call comprising the at least one parameter, wherein the CVSP is executed on the CVS using the at least one parameter, wherein the CVS is remote to the user device and the target device, and wherein the at least one parameter is received via the ACGUI, or via a file stored on at least one of the user device or the CVS.

\* \* \* \* \*